US009298411B2

(12) United States Patent
Kobayashi

(10) Patent No.: US 9,298,411 B2
(45) Date of Patent: Mar. 29, 2016

(54) APPARATUS AND COMPUTER-READABLE RECORDING MEDIUM FOR CONVERTING DATA INTO PRINTING DATA BASED ON SETTING CONDITIONS

(71) Applicant: Hiroto Kobayashi, Saitama (JP)

(72) Inventor: Hiroto Kobayashi, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 26 days.

(21) Appl. No.: 13/845,273

(22) Filed: Mar. 18, 2013

(65) Prior Publication Data

US 2013/0250331 A1    Sep. 26, 2013

(30) Foreign Application Priority Data

Mar. 21, 2012    (JP) .................................. 2012-064361

(51) Int. Cl.
*G06F 3/12*    (2006.01)

(52) U.S. Cl.
CPC ............ *G06F 3/1297* (2013.01); *G06F 3/1205* (2013.01); *G06F 3/1225* (2013.01); *G06F 3/1288* (2013.01)

(58) Field of Classification Search
CPC ..... G06F 3/1297; G06F 21/51; G06F 21/608; G06F 3/1225; G06F 3/1288; G06F 3/1203; G06F 3/1205; G06F 3/1237; G06F 3/1285
USPC ...................... 358/1.13, 1.15, 1.14
See application file for complete search history.

(56) References Cited

U.S. PATENT DOCUMENTS

| 2005/0270550 | A1* | 12/2005 | Sumio .......................... 358/1.13 |
| 2006/0285141 | A1* | 12/2006 | Kim ...................... G06F 3/1237 |
| | | | 358/1.13 |
| 2009/0083625 | A1* | 3/2009 | Liu .............................. 358/1.15 |
| 2009/0097059 | A1* | 4/2009 | Iijima .......................... 358/1.15 |
| 2009/0161156 | A1* | 6/2009 | Morita ......................... 358/1.15 |
| 2010/0302589 | A1  | 12/2010 | Kobayashi |
| 2011/0058199 | A1  | 3/2011  | Kobayashi |
| 2011/0063660 | A1* | 3/2011  | Yamada ....................... 358/1.15 |
| 2011/0116131 | A1* | 5/2011  | Mitsui ......................... 358/1.15 |
| 2011/0267628 | A1* | 11/2011 | Nishihara ..................... 358/1.6 |
| 2011/0286036 | A1  | 11/2011 | Kobayashi |
| 2012/0140269 | A1  | 6/2012  | Kobayashi |
| 2012/0176641 | A1* | 7/2012  | Ono ............................. 358/1.14 |
| 2012/0250083 | A1* | 10/2012 | Kobashi ...................... 358/1.15 |

FOREIGN PATENT DOCUMENTS

| JP | 2005-148928 | 6/2005 |
| JP | 2010-066876 | 3/2010 |

* cited by examiner

*Primary Examiner* — Benny Q Tieu
*Assistant Examiner* — Juan M Guillermety
(74) *Attorney, Agent, or Firm* — IPUSA, PLLC

(57) ABSTRACT

A computer-readable recording medium on which first and second programs are recorded for causing a data processing apparatus to perform a data processing method that includes a) accepting, by the first program, a first printing setting condition by using a base program, b) accepting, by the first program, a second printing setting condition from an application without using the base program, c) outputting, by the first program, the second printing setting condition to a third program that can process printing data, d) accepting, by the second program, the second printing setting condition from the third program when converting document data from the application into the printing data, and e) converting, by the second program, the document data into the printing data based on at least one of the first printing setting condition accepted by the first program and the second printing setting condition accepted by the second program.

20 Claims, 30 Drawing Sheets

FIG.4

DETAILS OF PRINTING METHOD

USER ID:
ARBITRARILY SET ▶

INPUT USER ID:
(WITHIN 8 LETTERS/NUMERALS[a-z,A-Z,0-9])

PASSWORD:
(NUMERAL FROM 0 TO 128 DIGITS)

OK  501
CANCEL  502
HELP

| INSTALLATION ENVIRONMENT | SPOOL FORMAT | RENDERING LOCATION | APPLICABILITY TO CONVENTIONAL TECHNOLOGY |
|---|---|---|---|
| LOCAL | RAW | LOCAL | ○ |
| | EMF | LOCAL | × |
| Point&Print | RAW | CLIENT | ○ |
| | EMF | CLIENT | ○ |
| | | SERVER | × |
| 64bitOS | RAW | CLIENT & SERVER | × |
| | EMF | CLIENT & SERVER | × |

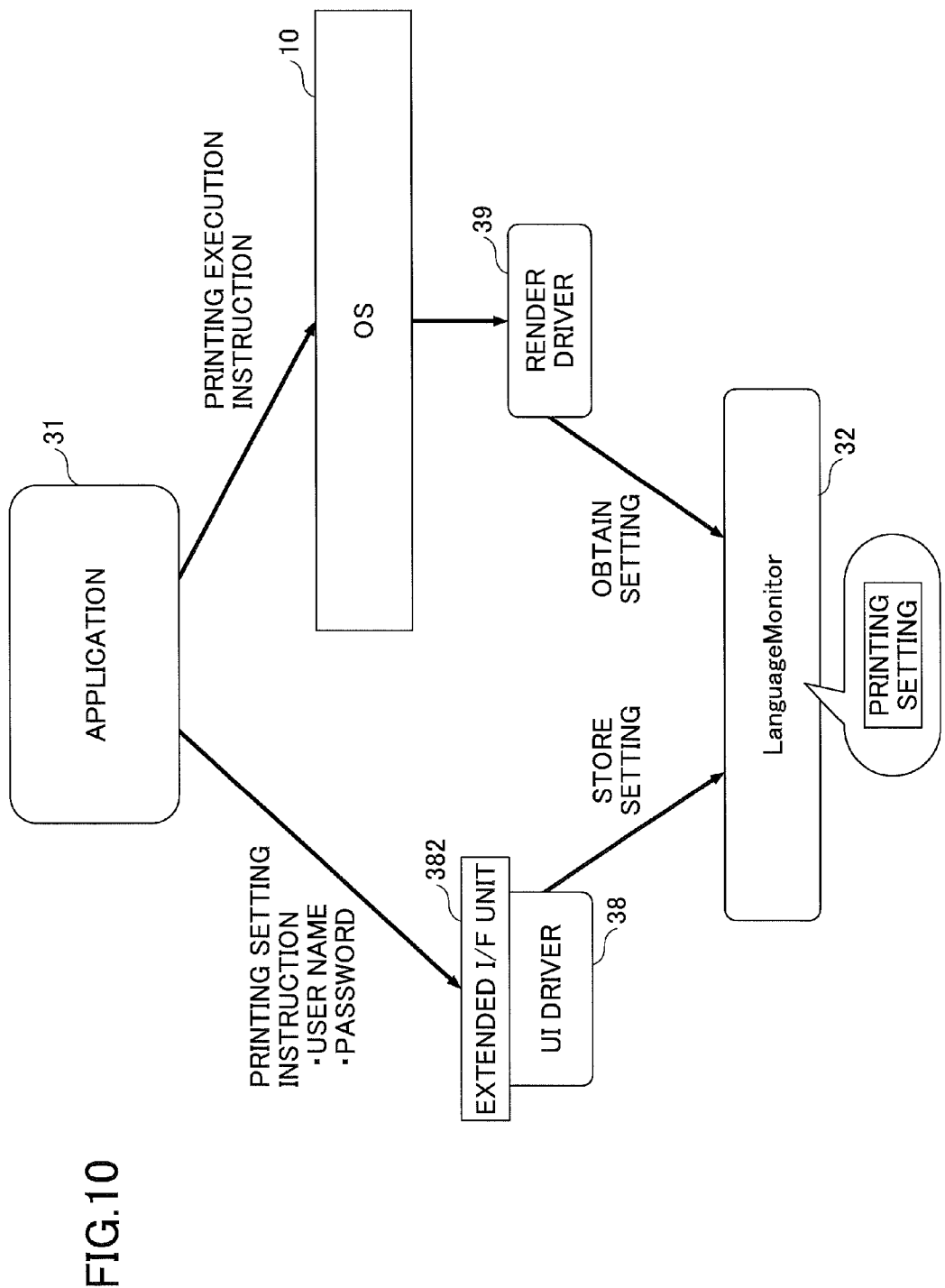

```
DWORD WINAPI
SendRecvBidiDataFromPort(
    HANDLE hport,
    DWORD dvAccessBit,
    LPCWSTR pAction,
    PBIDI_REQUEST_CONTAINER  pReqData,
    PBIDI_RESPONSE_CONTAINER *ppResData
);
```

FIG.19A

```
typedef struct _BIDI_REQUEST_CONTAINER {
    DWORD    Version;
    DWORD    Flags;
    DWORD    Count;
    BIDI_REQUEST_DATA aData[1];
} BIDI_REQUEST_CONTAINER, *PBIDI_REQUEST_CONTAINER,
  *LPBIDI_REQUEST_CONTAINER;
```

FIG.19B

```
typedef struct _BIDI_REQUEST_DATA {
    DWORD    dwReqNumber;
    LPWSTR   pSchema;
    BIDI_DATA data;
} BIDI_REQUEST_DATA, *PBIDI_REQUEST_DATA, *LPBIDI_REQUEST_DATA;
```

FIG.19C

APPARATUS AND COMPUTER-READABLE RECORDING MEDIUM FOR CONVERTING DATA INTO PRINTING DATA BASED ON SETTING CONDITIONS

BACKGROUND OF THE INVENTION

1. Field of the Invention

The present invention relates to a computer-readable recording medium and an apparatus for processing data based on setting conditions.

2. Description of the Related Art

A printing operation using a printer driver or a facsimile transmission operation using a PC-FAX driver is performed by executing the following processes.
(1) A user displays a printing setting screen by using a printing menu of an application, and sets printing conditions or transmission conditions. It is to be noted that, although the content of the settings of the transmission conditions and the settings of the printing conditions are actually different, both the settings of the printing conditions and the settings of the transmission conditions are hereinafter collectively referred to as "printing setting(s)".
(2) The user instructs printing be started by using the application.

The printer driver receives printing settings determined in the process (1) by way of a database referred to as a DEVMODE structure. Thereby, the printer driver converts document data received from the application into printing data that can be understood by a printer in accordance with the printing settings. The printer driver transmits the printing data to the printer or the facsimile machine. Thereby, printing is performed by the printer and facsimile transmission is performed by the facsimile machine.

In a case where a printer driver or a PC-FAX driver (hereinafter collectively referred to as "printer driver") receives printing settings from an application, the application notifies the printing settings to a GDI (Graphics Device Interface) of Windows by using an API of Windows. The GDI is a part of a Windows type OS.

The GDI notifies a printing setting instruction to the printer driver by way of the DDI (Device Driver Interface). Because only the I/F of the DDI is defined, each manufacturer (manufacturer of printer driver or PC-FAX driver) can design a method for implementation to the DDI (process performed by the printer driver in a case where the DDI is called).

However, even if a manufacturer uniquely defines an I/F for a printer driver, the I/F cannot be called because the Windows type OS is unable to know the I/F.

1. Regarding DEVMODE Structure

The DEVMODE structure, which stores printing settings therein, is divided into a public area and a private area. FIG. 1 is a schematic diagram for describing an example of a DEVMODE structure. FIG. 2 is a schematic diagram for describing a example of referring to a DEVMODE structure. The public area is an OS definition area. Therefore, an application can change the public area. The public area includes items that every printer driver needs to set such as "printing direction" or "paper size".

The private area is an area unique to each manufacturer. The private area can define what kind of data is to be stored with respect to a manufacturer or a printer driver. Because the application or Windows type OS is unable to know what kind of data is stored in the private area, the only way to change the private area is to use a UI driver of a printer driver to display the settings in the private area and accept changes to the displayed settings. The private area includes items having characteristics of a manufacturer or characteristics of a printer type such as "printing method" or "authentication".

The user sets printing conditions (e.g., paper size, number of pages, double-side printing) generated by the UI driver and instructs printing to be performed according to the printing conditions. When the user performs an operation for instructing the setting of printing conditions, an application calls the GDI by making a GDI call and sends the DEVMODE structure to the GDI. The application illustrated in FIG. 2 is an application such as a document generating program (e.g., MS-Word (registered trademark).

When the GDI obtains the DEVMODE structure from the application, the GDI calls a render driver of the printer driver by making a DDI call and sends the DEVMODE structure to the render driver.

The render driver refers to the DEVMODE structure obtained from the GDI, generates printing data complying with the printing settings from the document data instructed to be printed by the application, and sends the generated printing data to a spooler. It is to be noted that plotting data (e.g., PDL data) and control data (e.g., PJL printing command) are included in the printing data.

That is, the UI driver and the render driver can both refer to the DEVMODE structure. Further, the UI driver can display the private area and accept changes of printing settings.

2. Needs for Automation

Accordingly, the only method for changing the private area is to use a printer driver to display a setting screen and accept a user operation(s) performed on the setting screen. Therefore, an operation by the user is required for changing the private area.

However, some processes are desired to be completed fully automatically without requiring any user operation. The processes include, for example, a process of printing forms or a process of transmitting (sending) direct mail (DM) by facsimile. For these processes, operability would be degraded if a user has to change the private area by operating on a setting screen each time of printing a form or transmitting a document by facsimile even in a case where there the printing settings remains the same.

Therefore, there is a desire to be able to change a printing setting stored in the private area of the printer driver to a printing setting suitable for a given application without having to require the user's operation.

In order to fulfill such desire, some manufactures provide an extended I/F of a printer driver, so that an application can directly communicate with the printer driver (see, for example, Japanese Laid-Open Patent Publication No. 2005-148928). Further, applications suitable for a given process are developed to fulfill the user's desire.

FIG. 3 is a schematic diagram for describing an extended I/F, an application, and a DEVMODE structure. The application illustrated in FIG. 3 is an application suitable for a process by the user or an application for calling at least an extended I/F. The application of FIG. 3 calls the extended I/F to change the printing settings in the private area. Accordingly, after the user performs an operation of instructing printing to be started by using the application, printing can be completed without requiring the user's operation.

3. Regarding Printing Settings Stored in DEVMODE Structure

There are some printer drivers that re-display a setting screen after the user has instructed printing to be started, so that changes of printing settings can be accepted before printing data is transmitted.

FIG. 4 is a schematic diagram illustrating an example of re-displaying a setting screen (in this example of FIG. 4, a screen of a confidential printing function). In this example of FIG. 4, input of a user ID and a password is requested by a confidential printing function after printed is instructed to be started by the user. Unless the user inputs a user ID and a password, an OK button 51 cannot be depressed. When the OK button 51 is depressed after the user ID and the password are input, the user ID and the password are transmitted to a printer. A combination(s) of a user ID and a password is registered beforehand in the printer. Accordingly, the printer does not perform printing in a case where the registered combination does not match the transmitted user ID and the password. With this confidential printing function, input of a password may be required each time printing is instructed, so that security can be increased. In a case where the user depresses a cancel button 502, printing is cancelled.

Figure 5:
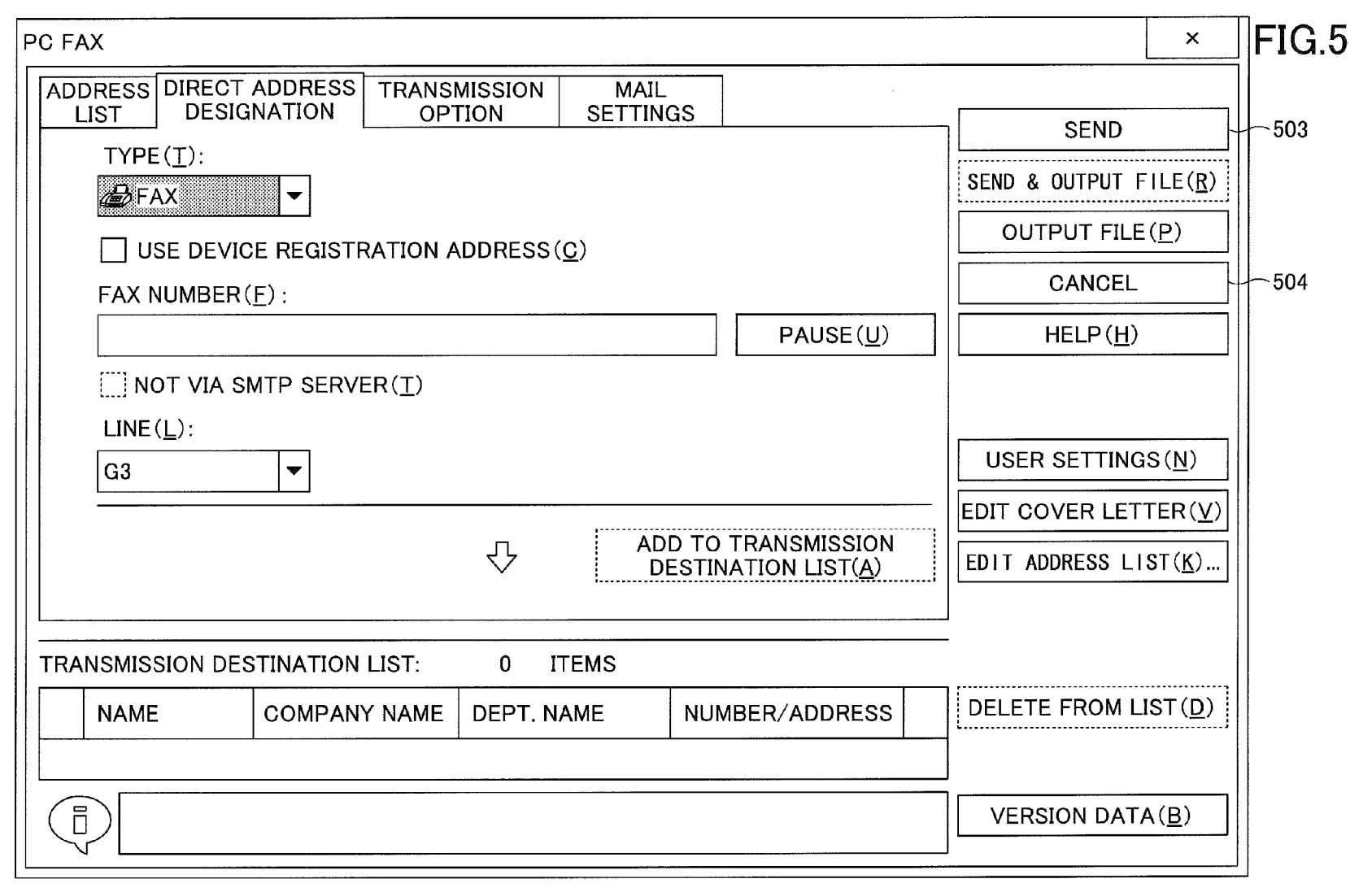

FIG. 5 is a schematic diagram illustrating an example of an address confirmation screen of a PC-FAX driver. The PC-FAX driver displays an address confirmation function screen and requests the user to input an address for facsimile transmission (e.g., facsimile number). In facsimile transmission, the PC-FAX driver displays the screen as illustrated in FIG. 5 for preventing inadvertent transmission in view that the address is often different for each transmission.

When the user inputs the facsimile number and depresses the send button, a facsimile machine performs facsimile transmission by transmitting, for example, image data. In a case where the user depresses a cancel button 504, the facsimile transmission is cancelled.

The settings applied in the examples of FIGS. 4 and 5 are used in cases that require input or confirmation in printing (job) units for the purpose of requesting the user to input a password each time of performing a printing process (so that security is increased) or requesting the user to confirm an designated address each time of performing facsimile transmission (so that inadvertent transmission is prevented).

Being able to change the printing settings after instructing the starting of a printing process means that there is no need to go through a process in which the application determines the printing settings (DEVMODE structure) and instructs execution of a printing process according to the printing settings by way of a UI driver. That is, printing can be performed without referring to the DEVMODE structure by having a render driver obtain and use printing settings that have been changed after instructing the starting of a printing process.

Therefore, the location in which printing settings are stored is not limited to the DEVMODE structure. For example, in an actual PC-FAX driver, printing settings such as facsimile transmission address data are stored in a file or a structure other than the DEVMODE structure. Some printer drivers store all settings in a structure other than the DEVMODE structure.

FIG. 6 is a schematic diagram illustrating an example of printing settings that may be stored outside the DEVMODE structure. For example, address data used during facsimile transmission or personal data used during printing are examples of printing settings that may be stored outside the DEVMODE structure.

Printing settings are not stored in the DEVMODE structure not only for a reason that the printing settings are not needed to be stored in the DEVMODE structure but for other reasons. For example, even if the printing settings can be stored in the DEVMODE structure, there may be a case where the printing settings are intentionally not stored in the DEVMODE structure.

As described above, printing settings may be stored in the DEVMODE structure by the UI driver or reference may be made to the printing settings in the DEVMODE structure by, for example, a graphics driver. In the case of storing printing settings in the DEVMODE structure or referring to the DEVMODE structure, the application is the source that transfers the DEVMODE structure. In reality, in the case of storing the printing settings in the DEVMODE structure, the application secures a memory space, provides the DEVMODE structure to the UI driver by way of the Windows type OS, and embeds data in the DEVMODE structure. In the case of referring to the DEVMODE structure where the application performs printing by way of the Windows type OS, the graphics driver refers to the data in the DEVMODE structure.

Accordingly, in a case where the application does not delete the DEVMODE structure, the printing conditions initially set by the user remains in the DEVMODE structure. Therefore, there is a risk that the file of the DEVMODE structure be transferred to another user. Although most applications delete the DEVMODE structure after a printing process is completed, there are some applications that do not delete the DEVMODE structure even after a printing process is completed.

Therefore, if personal data such as authentication data or a password is stored in the DEVMODE structure, the personal data remaining in a file of the DEVMODE structure could be transferred to an undesired user. This may result to degrading of security. Therefore, there are printer drivers that do not store personal data in the DEVMODE structure.

4. Printing Architecture of Windows Type OS

In performing printing with a printer driver, there are two types of printing architectures of Windows type OS. One is a RAW spool type and the other is an EMF spool type. In a case of printing with the RAW spool type, an application converts document data obtained by a printer driver into RAW data that can be understood by a printer (application process). From a user's standpoint, the user cannot operate the application until a printing process is completed.

In a case of printing with the EMF spool type, an application converts document data obtained by a Windows type OS into EMF data (which is printer independent data) (application process) and spools the EMF data (spooler process). Then, a printer driver converts the spooled EMF data into RAW data that can be understood by a printer. From a user's standpoint, the user can operate the application after the document data is converted into the EMF data.

Both of the above-described architectures can provide a DDI implementing method allows printing settings to be shown by displaying a printing setting screen after printing is started.

5. Point & Print

Next, there is described a relationship between an installing method of a printer driver or a PC-FAX driver and printing settings after printing is started. In the printer drivers of the Windows type OS, there is an installing method called "Point & Print".

FIG. 7 is a schematic diagram illustrating an example of a system for describing the Point & Print method. In the system illustrated in FIG. 7, a printer, a server PC, and a client PC are connected to a network. A Windows type OS is installed in the server PC and the client PC. The Windows type OS installed in the server PC is an OS dedicated for a server.

The client PC request the printer to perform printing by way of the server PC serving as a print server. In this system, the same printer driver is to be installed in the client PC and the server PC. This leads to a problem in which a large amount of time and workload is required for an administrator or the like to install the printer driver into each client PC in the network.

Point & Print is a method for resolving such problem by allowing a client PC to download and install a printer driver from a server PC. The Point & Print is a function included in a standard Windows type PS. In a printing process using Point & Print, there are both the RAW spool type and the EMF spool type.

In a case where the type of printing architecture is the EMF spool type, the user may change whether a rendering process (process performed by the render driver) should be performed by the client PC or the server PC. A rendering process performed on the client PC side is referred to as "client side rendering" whereas a rending process performed on the server PC side is referred to as "server side rendering".

6. 64 Bit OS

Under a situation where many users use client PC having a conventional 32 bit OS installed therein, the use of the 64 bit OS is also beginning to spread. The 64 bit OS, as a rule, only operates 64 bit applications. However, the Windows type OS provides a scheme (referred to as WOW 64 (Windows ON Windows 64)) for allowing operation of 32 bit applications that are already sold and distributed.

However, unlike an application, a printer driver is to be generated with 64 bits in the 64 bit OS. Therefore, a 64 bit printer driver is installed in the client PC.

In a case where a 32 bit application is operated with WOW 64, printing is performed in the following manner.

splwow64.exe is operated as the WOW 64.

A render instruction is notified from the 32 bit application to a 64 bit printer driver by way of the splwow64.exe.

In the Windows type OS, there is a scheme in which a "substitute driver" can be installed for sharing a printer (Point & Print). In this system, a printer driver installed in a server is installed in the client PC. In a case where a printer driver compatible to a printer is not installed in the client PC, a suitable printer driver is installed in the client PC. In this case, a 32 bit printer driver can be registered in the 64 bit OS.

However, the above-described conventional technology has the following difficulties.

A. Case of Using an Extended I/F

Even in a case where an extended I/F is used, there is a case where a printing setting cannot be stored.

As illustrated in FIG. 3, when an application changes a printing setting by using an extended I/F (extended by the printer driver), it is necessary of the application to perform the processes of inputting a DEVMODE structure to the extended I/F of the printer driver, receiving an output DEVMODE structure after changing the printing setting, and transferring the received DEVMODE structure to the render driver when printing is started.

In other words, in a case where the extended I/F is used and a printing setting is stored in a location other than the DEVMODE structure, the printer driver is unable to obtain printing settings by way of the extended I/F. Therefore, it becomes necessary to install all printing settings in the DEVMODE structure.

Accordingly, it may be difficult to appropriately implement printing settings in a case where the printer driver is related to personal data or a case where the printer driver determines/changes printing settings after starting of printing is instructed. The printer driver in these cases may be unable to store all printing settings (setting items) in the DEVMODE structure. Therefore, there is a case where printing settings cannot be stored even if the extended I/F is added to the UI driver.

B. Case of Temporarily Storing Printing Settings in a Location Other than the DEVMODE Structure.

In view of the above, there is a printer driver that outputs printing settings to, for example, a file, a registry, or a shared memory space.

FIG. 8 is a schematic diagram illustrating an example for describing a method of storing printing settings in a location other than a DEVMODE structure by way of an extended I/F of a printer driver. In FIG. 8, a part of or all printing settings are stored in a space referred to as "setting storage area".

With the method described with FIG. 8, it becomes possible to store printing settings that are not stored in the DEVMODE structure, to thereby solve the above-described difficulty of item A. However, by not using the DEVMODE structure, difficulties occur in the following three cases. The three cases include case 1 (which is a case of a printing sequence with an EMF spool), case 2 (which is a case of a printing sequence with a printer driver in which Point & Print is installed), and case 3 (which is a case of using 64 bit OS).

1. Case 1

A method of using a DEVMODE structure, which uses a DDI call sequence during printing, can be executed during RAW spool. However, in a case where a different spool type is used, the DDI call sequence (called by the Windows type OS) changes. The EMF spool includes a process of converting document data from an application into EMF data and a process of converting EMF data into render data that can be understood by a printer. Accordingly, a printing process sequence is performed twice inside the Windows type OS.

However, the twice-performed printing process sequences are performed with different processes with respect to the process of converting document data into EMF data and the process of converting EMF data into render data (RAW data) that can be understood by the printer. In a system such as the Windows type OS, accessibility to a resource is determined by authorization of a process (e.g., system authorization and authorization other than the system authorization). Therefore, depending on the location of a file or registry in which printing settings are stored, it is possible that the printing settings set by the extended I/F cannot be obtained from the stored location when the printer interprets the printing data. Further, with a recent Windows type OS, access may be completely denied if authorization is different from the standpoint of security.

2. Case 2

The method of using an extended I/F can be executed by a method of installing a printer driver to a PC of the user in a local environment.

However, in a case of a printer driver installed by using the above-described Point & Print method, there is a case where an I/F driver and a render driver are operated at different locations (in a case of server side rendering).

In a case of client side rendering, both the UI driver and the render driver operate on the client PC side. However, in a case of server side rendering, the UI driver operates on the client PC side whereas the render driver operates on the server PC side. Because the PCs that are operated are physically different from each other in the case of server side rendering, the printer driver cannot obtain the printing settings that are temporarily stored in the setting storage area (e.g., file, registry) by way of the extended I/F of the printer driver.

3. Case 3

As described above, the WOW 64 is a scheme provided by the Windows type OS, splwow64.exe only operates when printing is performed. Because the Windows type OS does not support a 64 bit extended I/F being accessed by a 32 bit application, splwow64.exe cannot be operated. Therefore, the 32 bit application cannot use a printer driver having the 64 bit extended I/F.

FIG. 9 is a schematic diagram for describing whether it is possible to transfer printing settings in a case where an extended I/F is used. FIG. 9 shows that transferring of printing settings is difficult i) in a case of using the EMF spool where the installation environment is local, ii) in a case of using the EMF spool where the installation environment is Point & Print and the rendering location is the server, and iii) in a case where a 32 bit application is operated in a 64 bit OS.

SUMMARY OF THE INVENTION

The present invention may provide apparatus and computer-readable recording medium for processing data based on printing setting conditions that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by apparatus and computer-readable recording medium for processing data based on printing setting conditions particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a computer-readable recording medium on which first and second programs are recorded for causing a data processing apparatus to perform a data processing method, the data processing method including the steps of: a) accepting, by the first program, a first printing setting condition by using a base program; b) accepting, by the first program, a second printing setting condition from an application without using the base program; c) outputting, by the first program, the second printing setting condition to a third program that can process printing data; d) accepting, by the second program, the second printing setting condition from the third program when converting document data from the application into the printing data; and e) converting, by the second program, the document data into the printing data based on at least one of the first printing setting condition accepted by the first program and the second printing setting condition accepted by the second program.

Other objects, features and advantages of the present invention will become more apparent from the following detailed description when read in conjunction with the accompanying drawings.

BRIEF DESCRIPTION OF THE DRAWINGS

FIG. 4 is a schematic diagram illustrating an example of re-displaying a setting screen;

FIG. 5 is a schematic diagram illustrating an example of an address confirmation screen of a PC-FAX driver;

FIG. 9 is a schematic diagram for describing whether it is possible to transfer printing settings in a case where an extended I/F is used;

FIG. 10 is a schematic diagram for describing characteristics of a printer driver according to an embodiment of the present invention;

FIG. 19A is a schematic diagram for describing an example of a format of "SendRecvvBidiDataFromPort( )";

FIG. 19B is a schematic diagram for describing an example of a format of a "BIDI_REQUEST_CONTAINER" structure;

FIG. 19C is a schematic diagram for describing an example of a format of a BIDI_REQUEST_DATA structure;

DETAILED DESCRIPTION OF THE PREFERRED EMBODIMENTS

Figure 1:
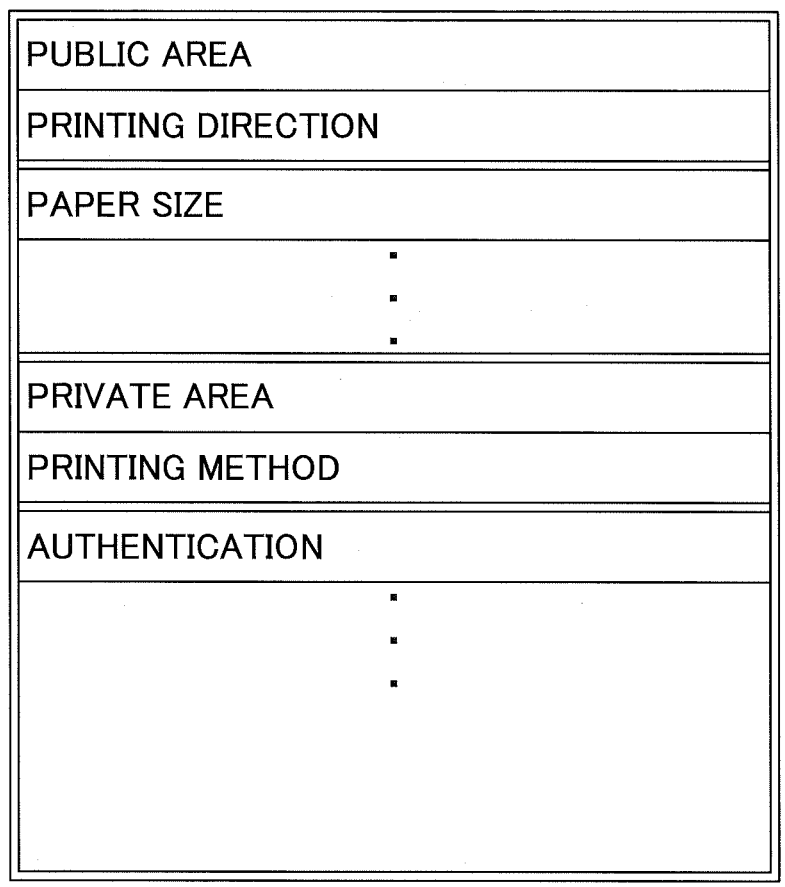
FIG. 1 is a schematic diagram for describing an example of a DEVMODE structure.
Figure 2:
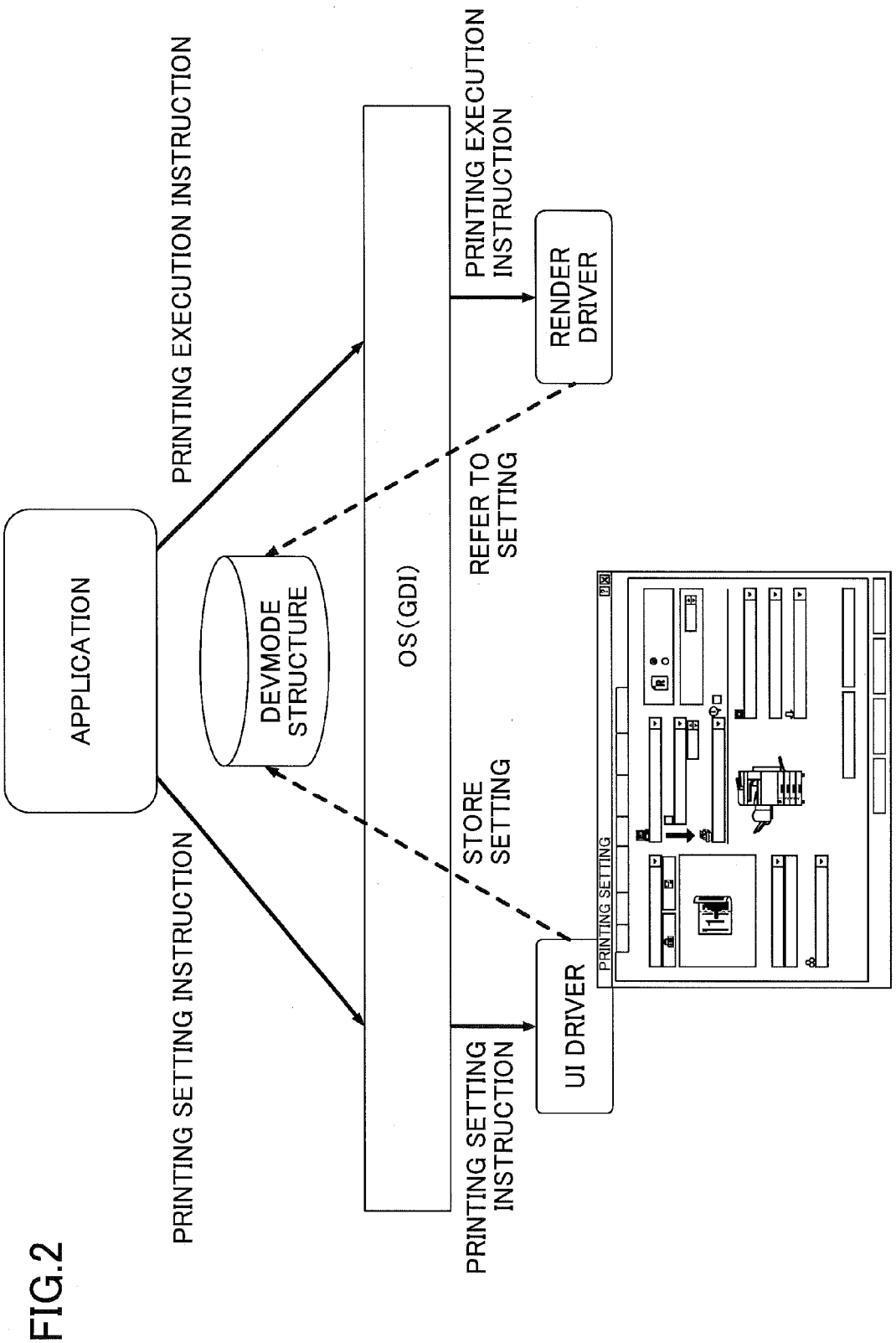
FIG. 2 is a schematic diagram for describing a example of referring to a DEVMODE structure.
Figure 3:
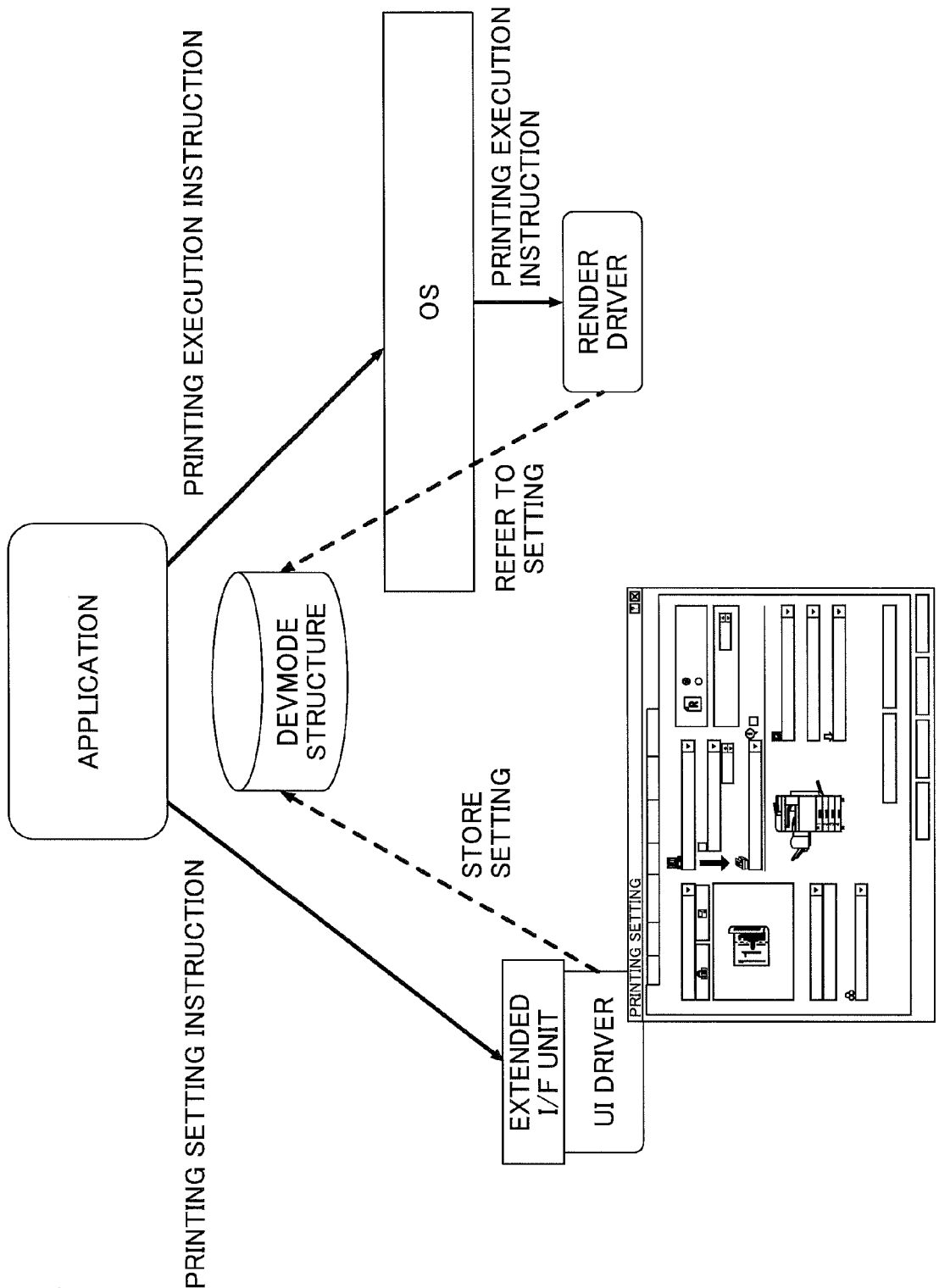
FIG. 3 is a schematic diagram for describing an extended I/F, an application, and a DEVMODE structure.
Figure 6:
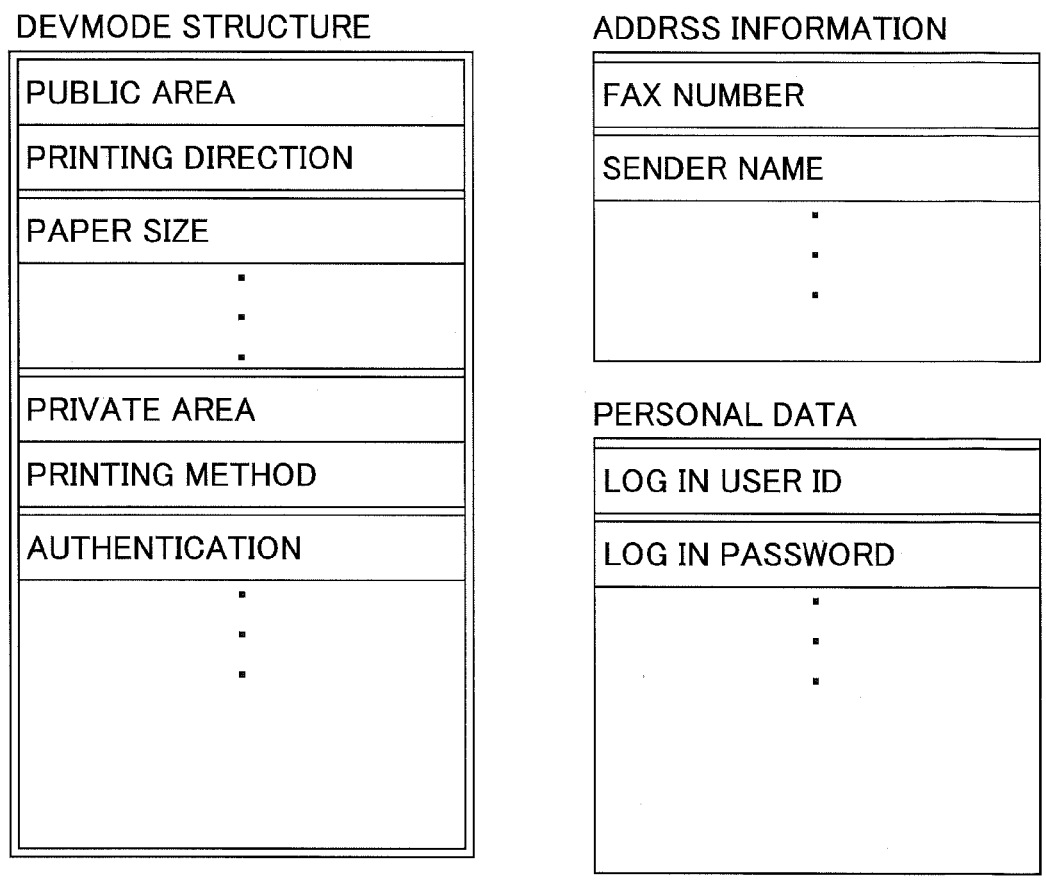
FIG. 6 is a schematic diagram illustrating an example of printing settings that may be stored outside a DEVMODE structure.
Figure 7:
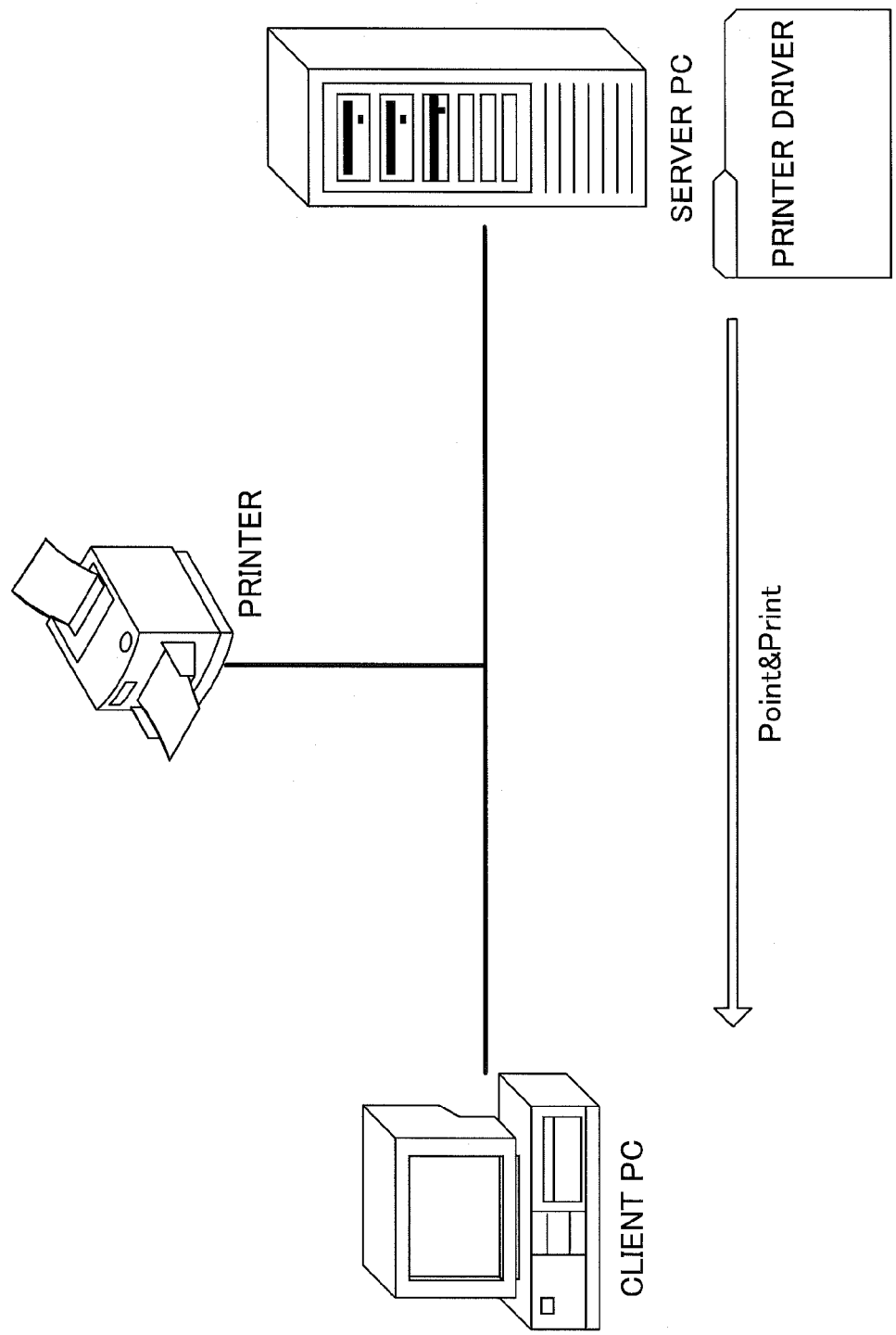
FIG. 7 is a schematic diagram illustrating an example of a system for describing a Point & Print method.
Figure 8:
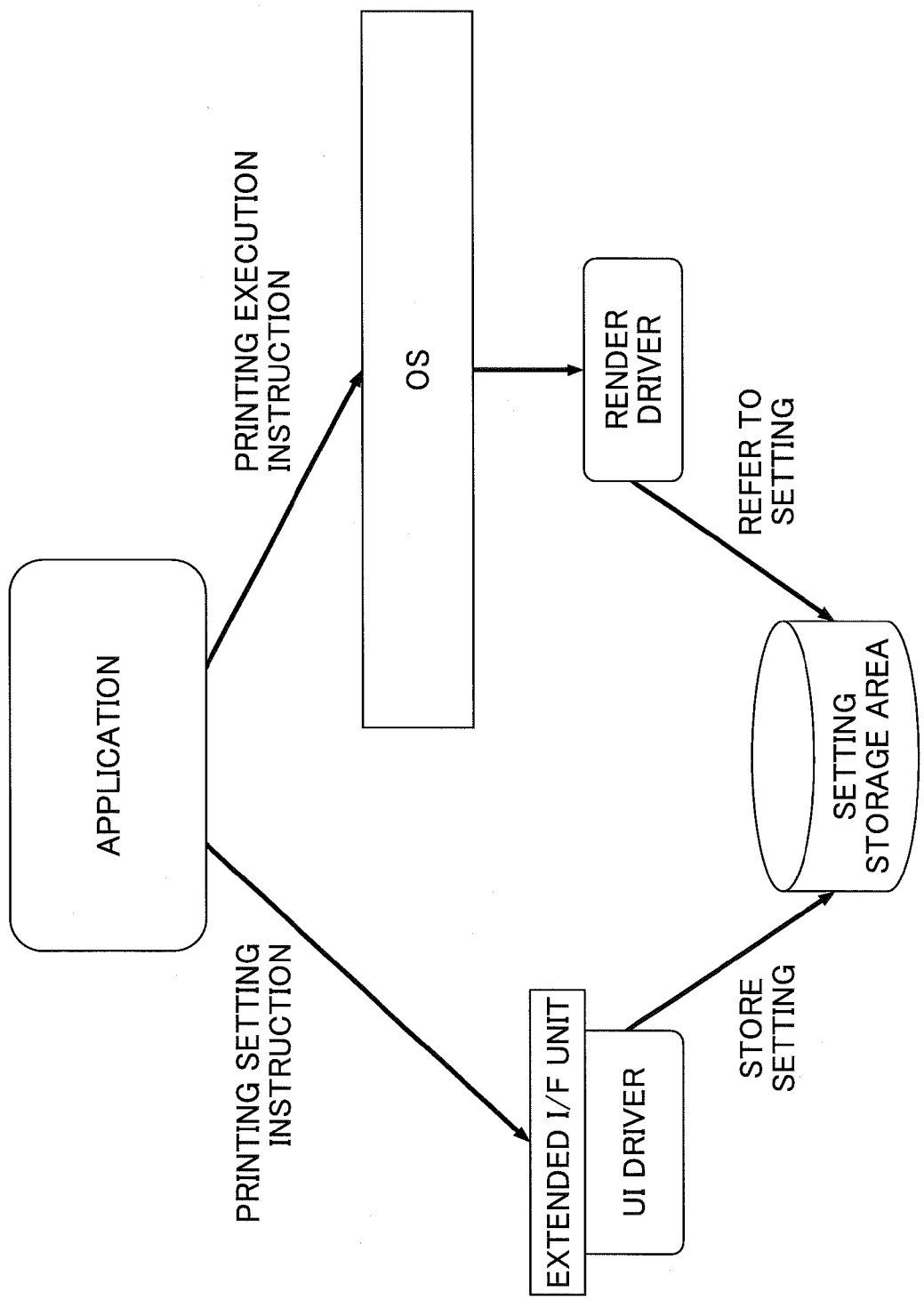
FIG. 8 is a schematic diagram illustrating an example for describing a method of storing printing settings in a location other than a DEVMODE structure by way of an extended I/F of a printer driver.

Illustrative embodiments of the present invention are described with reference to the accompanying drawings.

FIG. 10 is a schematic diagram for describing the characteristics of the below-described printer driver 30 according to an embodiment of the present invention.

(1) A UI driver 38 of the below-described printer driver 30 provides a unique extended I/F unit 382 to an application. The extended I/F unit 382 is an interface other than the DDIs (Device Driver Interface) defined by the Windows type OS (Operating System). The UI driver 38 can accept (receive) changes of a printing setting by way of the extended I/F unit 382.

(2) The UI driver 38 stores the printing setting accepted by the extended I/F unit 382 in a Language Monitor 32. In a case where there is a printing setting set by the application 31 by way of the UI driver 38, the printing setting is stored in a DEVMODE structure. However, the printing setting is stored in, for example, the Language Monitor 32 and a printing setting stored in the DEVMODE structure are hereinafter collectively referred to as "printing setting". That is, the term "printing setting" is used regardless of the location in which the printing setting is stored. The Language Monitor 32 can store a printing setting with respect to each logical printer of the printer driver 30. The Language Monitor 32 is a type of API (Application Programming Interface). Therefore, in the following description of the embodiments, setting a printing condition to the Language Monitor 32 directly from the UI driver 38 or the like means that the printing condition is set by the UI driver 38 or the like by way of an API.

(3) When the application 31 outputs an instruction to execute printing (printing execution instruction) to the Windows type OS, a render driver 39 of the printer driver 30 reads out the printing setting from the Language Monitor 32. The Language Monitor 32 sends the printing setting to the render driver 39. In a case where a printing setting is registered in the DEVMODE structure, the render driver 39 also reads out the printing setting from the DEVMODE structure.

(4) The render driver 39 generates a command to a printer (Printer Job Language (PJL)) or printing data to be printed by the printer (Printer Description Language (PDL)) in accordance with the obtained printing setting(s).

Because the application 31 sets the printing setting by way of the extended I/F unit 382, there is no need to store highly confidential data in the DEVMODE structure.

By using the Language Monitor 32, the render driver 39 can obtain printing settings regardless of whether a RAW spool or a EMF spool is used as the printing architecture. That is, denial of access due to, for example, use of different processes can be prevented because the Language Monitor 32 is a part of a function of the Windows type OS.

Further, the render driver 39 can access the Language Monitor 32 even if rendering is performed on the server side because the Language Monitor 32 is a function supported by the Windows type OS as described below. Therefore, even in a case where the printer driver 30 is installed in the below-described client PC (Personal Computer) 100 by a Point & Print method, a printing setting can be obtained by the render driver 39.

[Configuration]

Figure 11A:
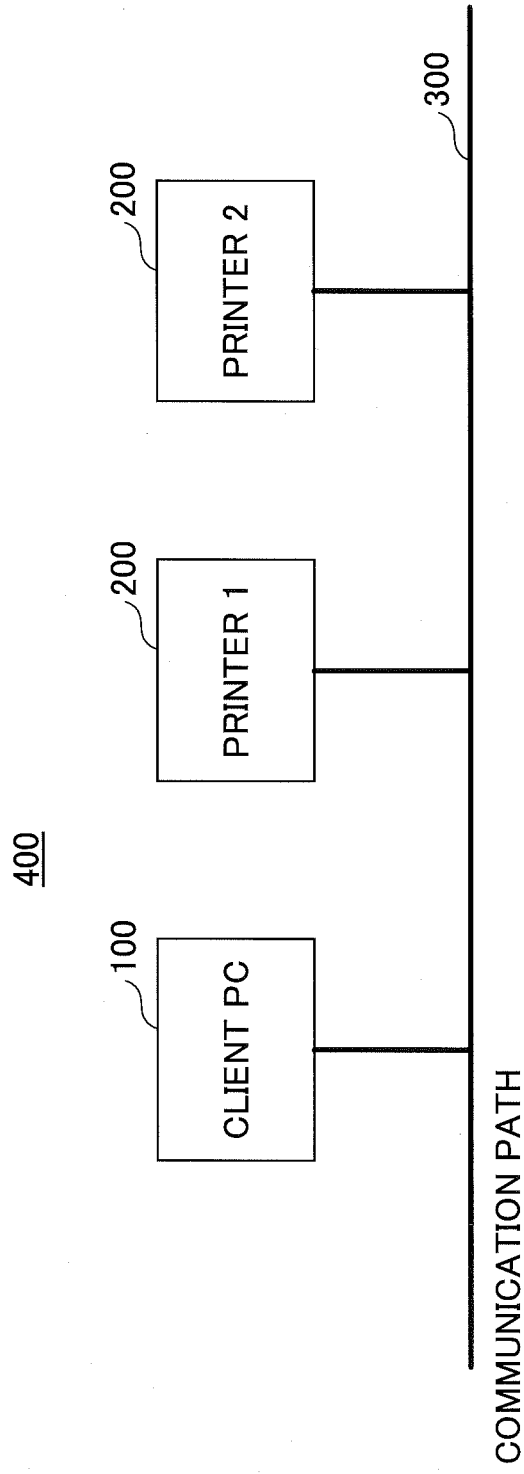
FIG. 11A is a schematic diagram illustrating a configuration of a printing system according to an embodiment of the present invention.
Figure 11B:
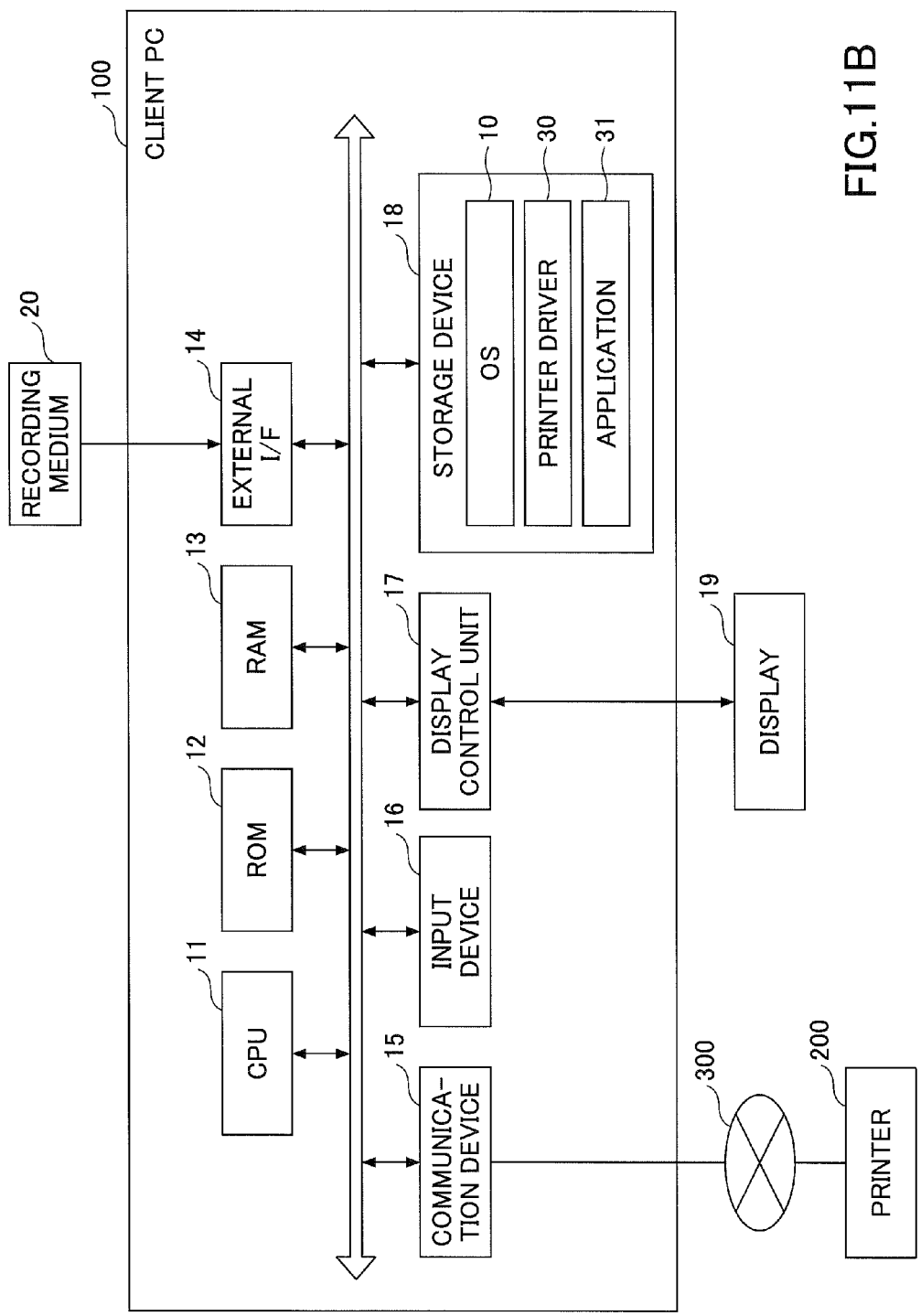
FIG. 11B is a schematic diagram illustrating a hardware configuration of a client PC according to an embodiment of the present invention.

FIG. 11A is a schematic diagram illustrating a configuration of a printing system 400 according to an embodiment of the present invention. FIG. 11B is a schematic diagram illustrating a hardware configuration of a data processing apparatus (in this embodiment, client PC) 100 according to an embodiment of the present invention. In FIGS. 11A and 11B, the client PC 100 and an image forming apparatus (in this embodiment, printer) 200 are connected to each other via a network 300. In this embodiment, the printer 200 may be one or more printers.

In a case where the client PC 100 accepts an operation from a user, the application 31 requests printing to be performed by using, for example, a GDI, a DDI, and the printer driver 30. The printer driver 30 generates printing data by performing the below-described processes and transmits the generated printing data to the printer 200. As long as the printer 200 includes an image forming function, the name of the printer 200 is not limited to a printer but may also be, for example, a copy machine, a duplicating machine, or a facsimile machine (image transmitting apparatus). The client PC 100 and the printer 200 may be directly connected to each other with, for example, a USB (Universal Serial Bus) cable.

The client PC 100 is connected to a CPU 11, a ROM (Read Only Memory) 12, a RAM (Random Access Memory) 13, an external I/F 14, a communication device 15, an input device 16, a display control unit 17, and a storage device 18 via a bus. The CPU 11 reads out an OS 10, the application 31, and the printer driver 30 from the storage device 18 and executes the OS 10, the application 31, and the printer driver 30 by using the RAM 103 as a working memory.

As long as the application 31 can request the printer 200 to perform printing, the application 31 may be any type of software or program. For example, the application 31 may be, for example, document generating software browser software, or a presentation document generating software. Further, the application 31 may be any type of software or program as long as the application 31 can generate, display, and manage document data (printing object) for enabling the document data to be printed. The document data (printing object) is not limited to data including characters (letters), symbols, or numerals but may also be data including images or photographs.

The RAM 13 is a working memory (main storage memory) that temporarily stores necessary data therein. The ROM 12 stores, for example, BIOS, initial setting data, and starting programs therein.

The external I/F 14 is an interface to which a cable (e.g., USB cable) or a portable recording medium 20 is mounted. The communication device 15 transmits packet data (in this embodiment, printing data) to the printer 200 according to an instruction(s) from the CPU 11. The communication device 15 may be, for example, a LAN (Local Area Network) card or an Ethernet (registered trademark) card.

The input device 16 is a user interface that accepts various operations (instructions) from the user. The input device 16, may be, for example, a keyboard, a mouse, a touch panel, or a audio input device. The display control unit 17 controls the rendering of a display 19 by controlling, for example, resolution or the number of colors according to screen data designated by the application 31. The display 19 may be a FPD (Flat Panel Display) including, for example, a liquid crystal display or an organic electroluminescence display.

The storage device 18 is a non-volatile memory that stores the OS 10, the printer driver 30, and the application 31 therein. The storage device 18 may be, for example, a HDD (Hard Disk Drive) or a flash memory.

The OS 10 is preferably a Windows type OS. However, other operating systems having substantially the same functions as the Windows type OS may be used. The Windows type OS used on the client side may be, for example, Windows NT, Windows 98, Windows 2000, Windows ME, Windows XP, Windows Vista, Windows 7, Windows 7, and other subsequent versions of the Windows type OS. The Windows type OS used on the server side may be, for example, Windows 2000 Server, Windows 2003 Server, Windows 2008 Server, and other subsequent versions of the Windows type OS.

The storage medium 20 is, for example, a non-volatile memory such as an SD (Secure Digital) card or a USB memory. The printer driver 30 may be distributed in a state recorded onto the recording medium 20 or downloaded from a server (not illustrated). In a case where a Point & Print is used, the printer driver 30 is downloaded from a server PC (not illustrated in FIG. 11).

Figure 12:
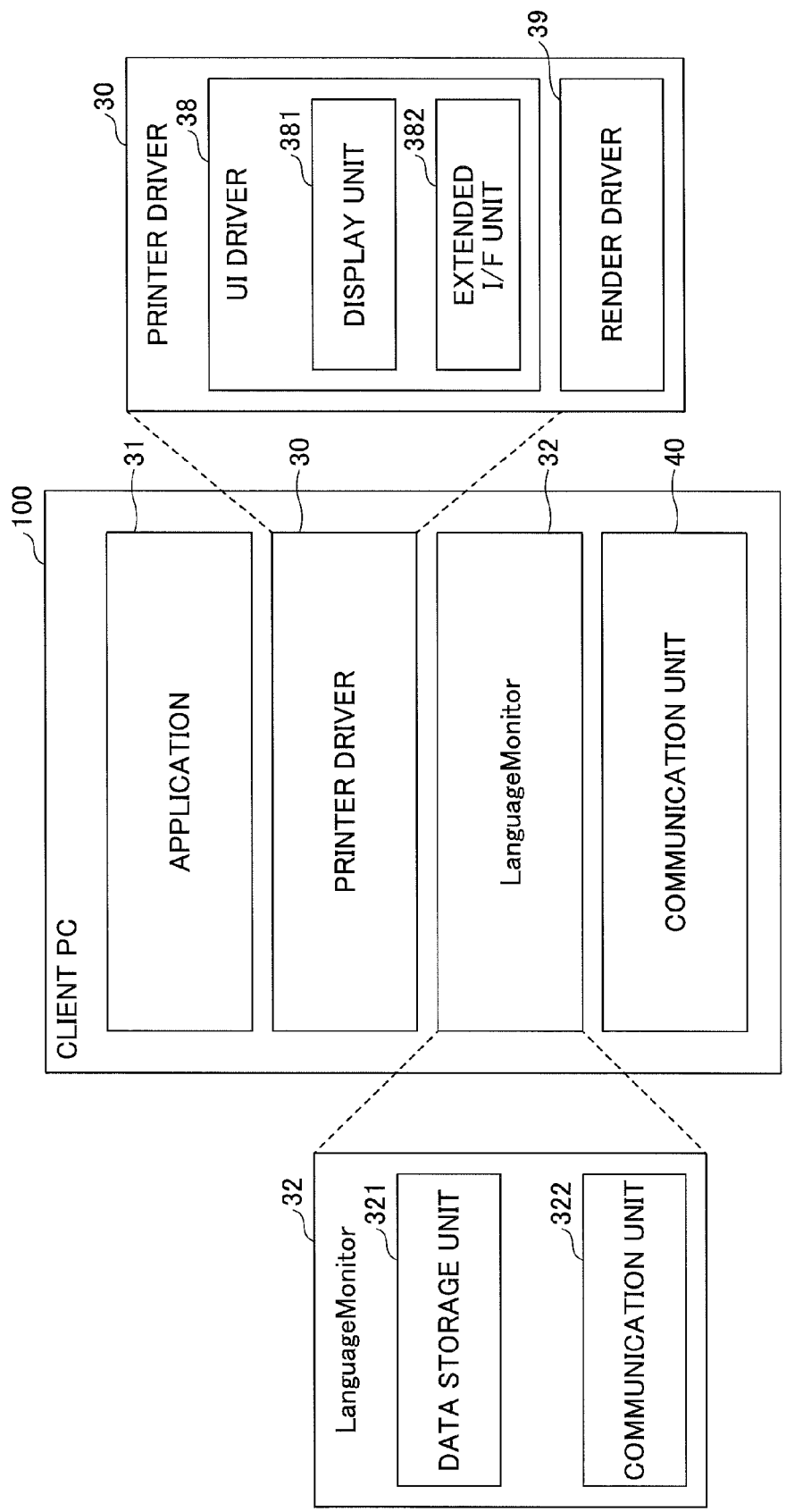
FIG. 12 is a block diagram illustrating functions or functional components of a client PC and a printer driver according to an embodiment of the present invention.

FIG. 12 is a block diagram illustrating functions or functional components of the client PC 100 and the printer driver 30. The client PC 100 includes the application 30, the printer driver 30, the Language Monitor 32, and the communication unit 40 that are operated by the Windows type OS. Because the Language Monitor 32 is a function provided by the Windows type OS, the Language Monitor 32, in a broad sense, may be regarded as a part of the Windows type OS. Although not illustrated in the drawings, components such as a GDI, a spooler, and a printer processor are also installed in the client PC 100 together with the Windows type OS.

The printer driver 30 includes the UI driver 38 and the render driver 39. Further, the UI driver 38 includes a display unit 381 and an extended I/F unit 382. The display unit 381 of the UI driver 38 displays a printing setting screen (also referred to as "printing dialog") on the display 19 in a case where the user inputs a document printing operation to the application 31. The user may set printing conditions such as "number of pages", "double-side printing", "N-up printing", "book binding", "reduce/enlarge" by operating the printing setting screen. Further, the display unit 381 may display the printing setting screen and accept changes of printing settings even after the user instructs printing to be started. The printing setting is stored in a data table (data structure) referred to as the DEVMODE structure (hereinafter also simply referred to as "DEVMODE"). The DEVMODE is a data structure to which member variables are defined for allowing printing conditions to be commonly set by various printer drivers 30 operated by the Windows type OS.

Further, the extended I/F unit 382 included in the UI driver 38 accepts printing settings from the application 31 without the intervening of the Windows type OS. Regularly, in order for the application 31 to access the UI driver 38, the application 31 makes a GDI call and accesses the UI driver 38 by way of the Windows type OS. However, the extended I/F unit 382 is an interface unique to the printer driver 30 which allows the UI driver 38 to accept printing settings and settings during a printing process (e.g., batch transmission setting) directly from the application 31 (without the intervention of the Window type OS).

The render driver 39 refers to the DEVMODE (in a case where printing settings are included in the DEVMODE) and printing settings (and also the below-described operation settings in a case where the operations settings are accepted) and generates printing data by converting document data (printing object) into printing data according to the printing settings.

The Language Monitor 32 includes a data storage unit 321 and a communication unit 322. The communication unit 322 controls data communications (transmission/reception) in a case where the printer driver 30 transmits printing data to the communication unit 40. The communication unit 322 controls data communications between the Language Monitor 32 and the communication unit 40 of the client PC 100. The communication unit 322 can receives a message from the printer 200 via the communication unit 40. The data storage unit 321 stores printing settings therein. The printer driver 30 implements the data storage unit 321 by using the functions of the Language Monitor 32. Therefore, there is no need or hardly any need for changing the Windows type OS. It is to be noted that the data storage unit 321 is described in detail below.

The communication unit 40 of the client PC 100 is a functional component for communicating with the printer driver 200. The communication unit 40 is operated with a protocol such as TCP/IP.

Figure 13:
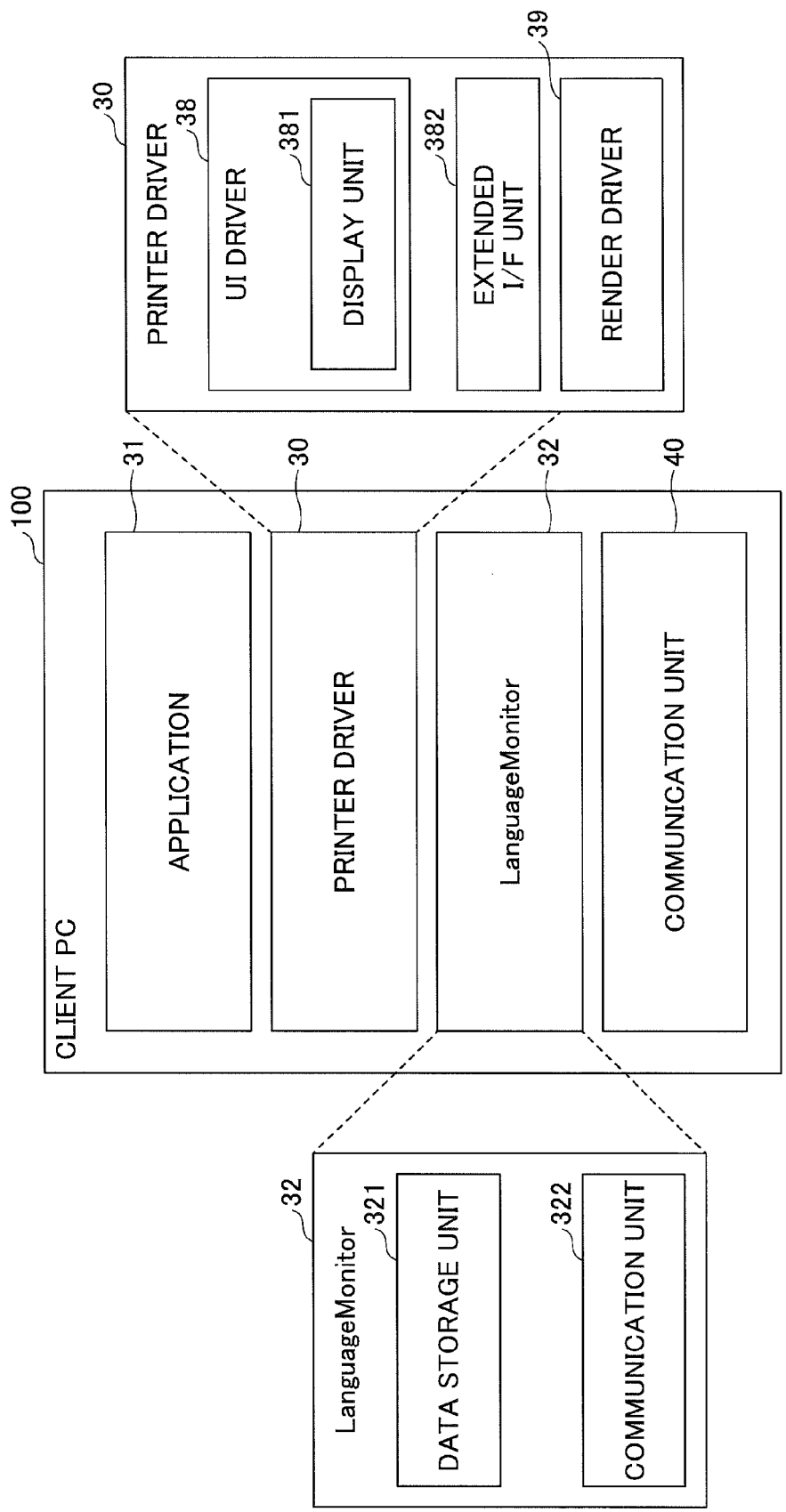
FIG. 13 is a block diagram illustrating functions or functional components of a client PC and a printer driver according to another embodiment of the present invention.

Although the extended I/F unit 382 is illustrated inside the UI driver 38 in FIG. 12, the extended I/F unit 382 may be provided outside the UI driver 38 as long as the extended I/F unit 382 is included in the printer driver 30. Therefore, the extended I/F unit 382 may be separate (independent) from the UI driver 38 as illustrated in FIG. 13.

Figure 14:
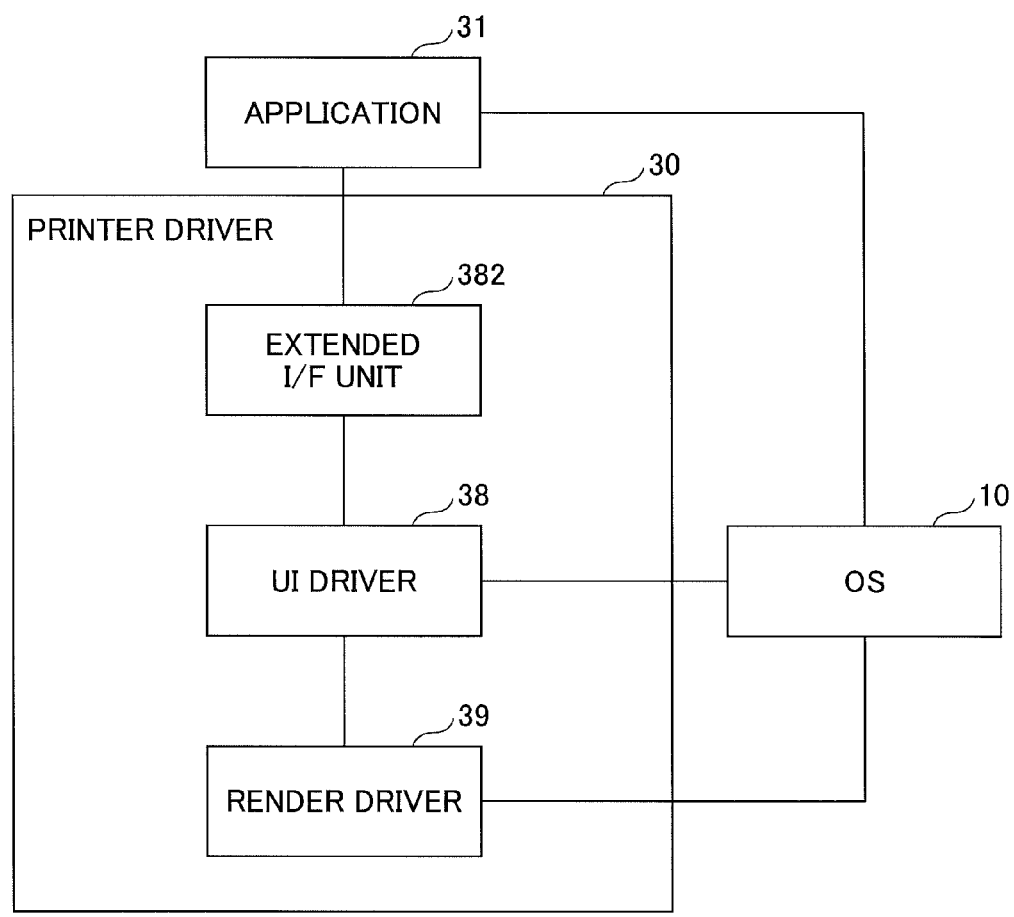
FIG. 14 is a schematic diagram for describing a relationship between an extended I/F unit of a printer driver, an application, and an operating system according to an embodiment of the present invention.

FIG. 14 is a schematic diagram for describing a relationship between the extended I/F unit 382 of the printer driver 30, the application 31, and an operating system (in this embodiment, Windows type OS) 10. In a case supposing that the UI driver 38 does not include an extended I/F unit such as the extended I/F unit 382, the application 31 and the printer driver (including the UI driver 38 and the render driver 39) 30 would always transfer data via the OS 10.

However, by including the extended I/F unit 382 in the printer driver 30, the application 31 and the printer driver 30 can directly transfer data. That is, the application 31 and the printer driver 30 can transfer data without the intervening of the OS 10. Therefore, the application 31 can directly set printing settings (printing conditions) to the printer driver 30.

Figure 15:
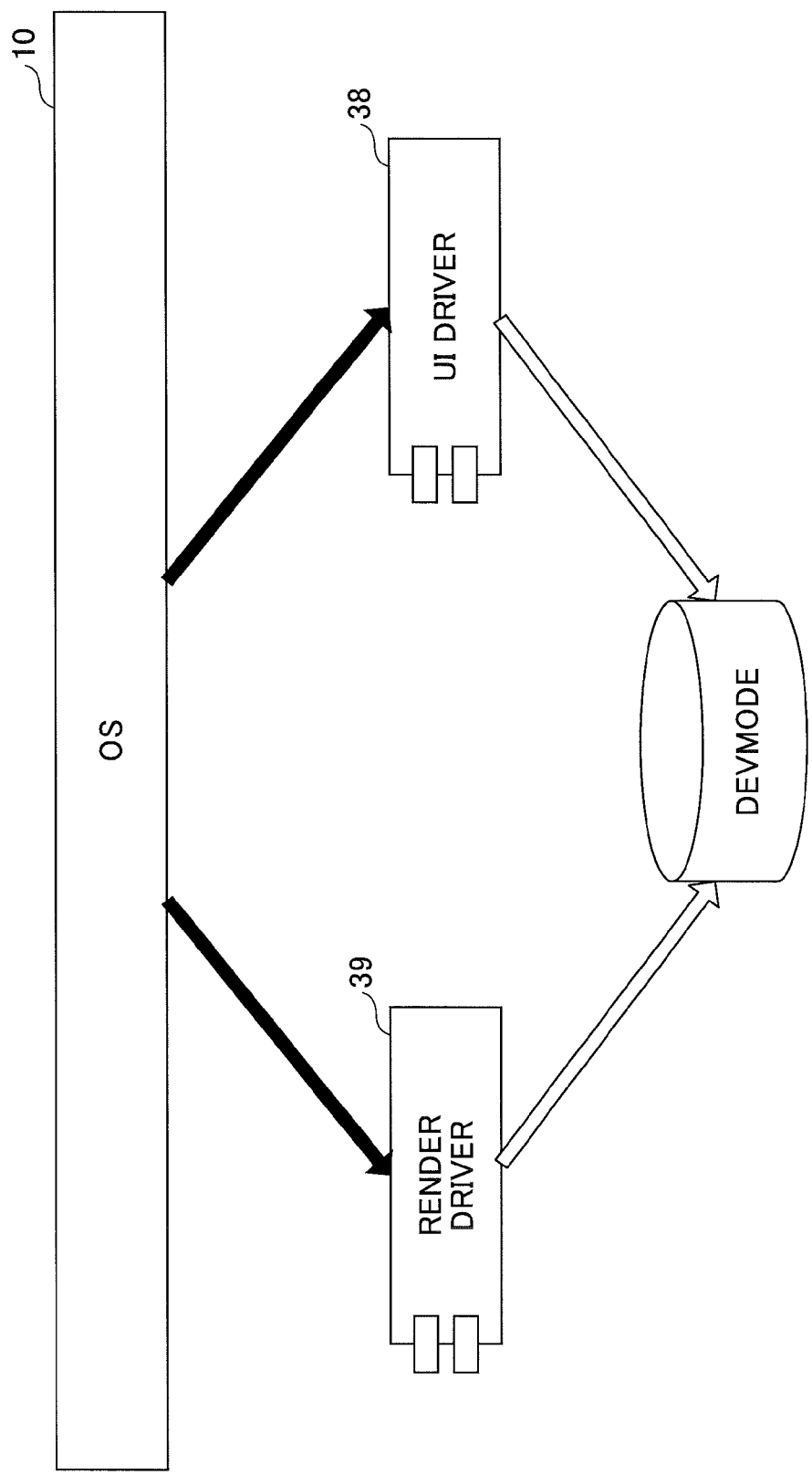
FIG. 15 is a schematic diagram for describing a render driver and a UI driver of a printing architecture of a Windows type OS according to an embodiment of the present invention.

FIG. 15 is a schematic diagram for describing the render driver 39 and the UI driver 38 of an printing architecture of the Windows type OS according to an embodiment of the present invention. A GDI 34 of the Windows type OS calls the UI driver 38 and the render driver 39 of the printer driver 30 by making a DDI call to the printer driver 30. The UI driver 38 and the render driver 39 do not directly communicate with each other. However, because a DEVMODE is in the parameters of the DDI (serving as an I/F for calling the printer driver from the Windows type OS), both the UI driver 38 and the render driver 39 can refer to the DEVMODE. The UI driver 38 called by the Windows type OS accepts printing settings from the user and stores the printing settings in the DEVMODE. The DEVMODE is transferred from the Windows type OS to the render driver 39 when preparation for printing is started. That is, by determining a "printing setting" with the UI driver 38 and accepting the "printing setting" with the render driver 39 when preparation of printing is started, a printing command or render data can be generated in accordance with the printing setting. This is a basic printing sequence of the printing architecture of the Windows type OS.

Accordingly, if a printer driver that only complies with printing architecture of the Windows type OS is used, the render driver 39 would be unable to refer to the printing settings that are not store in the DEVMODE. However, with the printer driver 30 according to an embodiment of the present invention, the printer driver 30 can refer to both the printing settings in the DEVMODE and the printing settings set to the Language Monitor 32.

Figure 16:
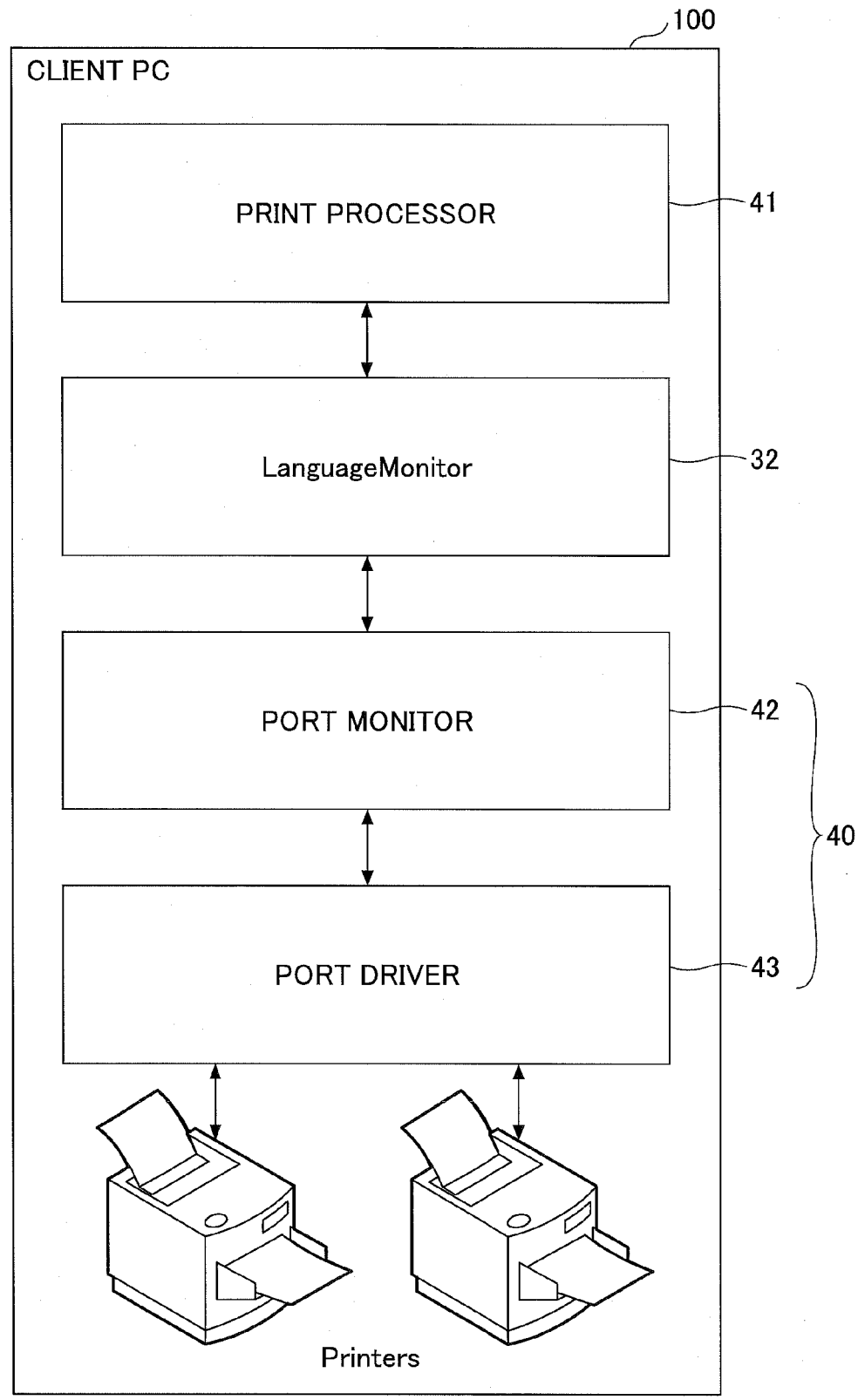
FIG. 16 is a schematic diagram for describing an operation of a Language Monitor according to an embodiment of the present invention.

FIG. 16 is a schematic diagram for describing an operation of the Language Monitor 32 according to an embodiment of the present invention. The Language Monitor 32 receives printing data transmitted from a print processor 41 and transmits the printing data to the communication unit 40 (port monitor 41 and port driver 43). The print processor 41 includes a function of a spooler. The port monitor 42 performs a process based on a communication protocol and transmits printing data to the port driver 43. The port driver 43 controls a connection interface (e.g., USB, NIC) between the printer 200 and the client PC 100 and transmits the printing data to the printer 200.

According to the Windows type OS, the printer driver 30 can use both the Language Monitor 32 provided by the Windows type OS and the Language Monitor 32 provided by a manufacturer (e.g., printer manufacturer, facsimile manufacturer). The Language Monitor 32 according to an embodiment of the present invention can include a Language Monitor that is commercially available and a Language Monitor that is provided by a manufacturer.

[Example of Use]

Figure 17:
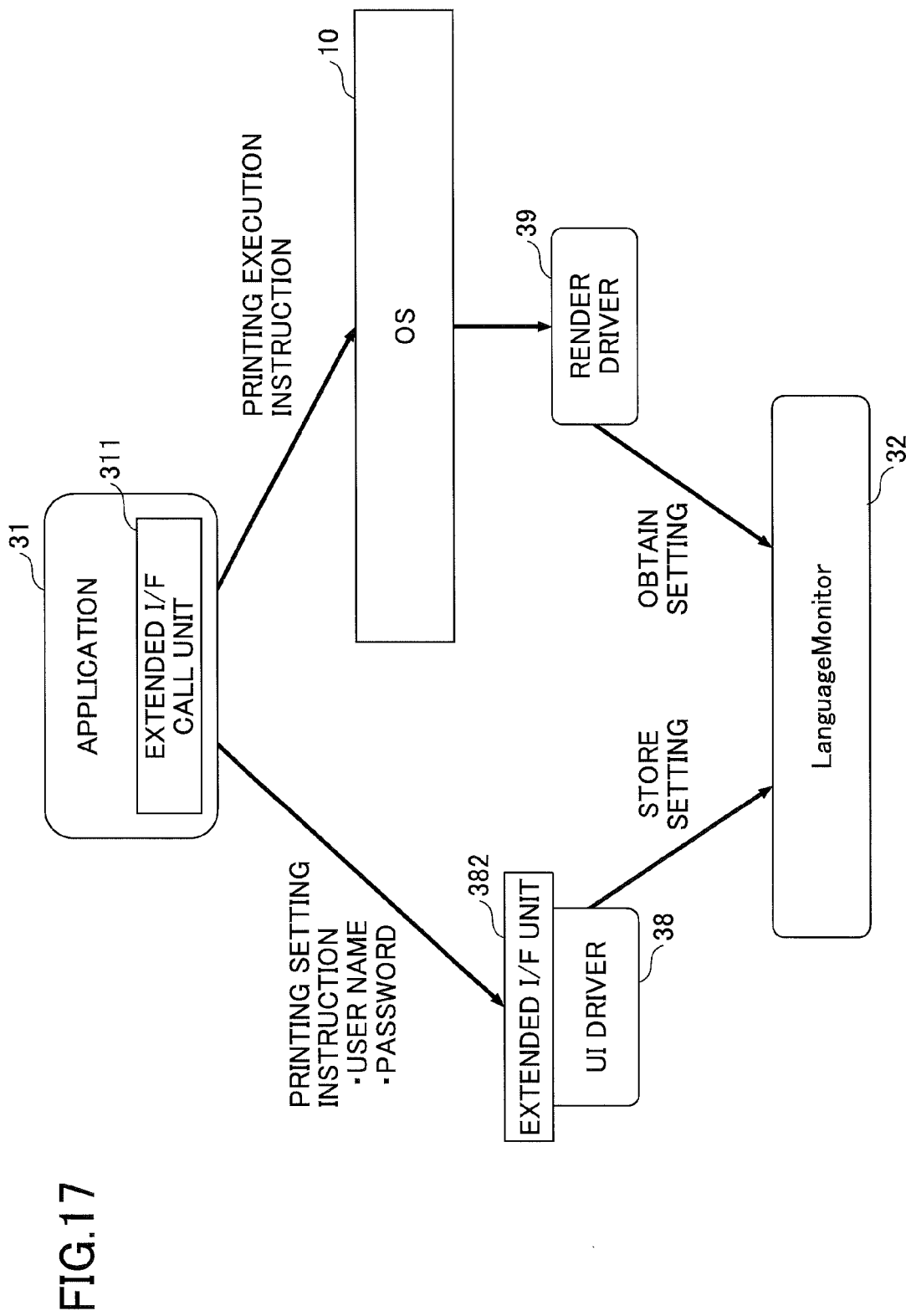
FIG. 17 is a schematic diagram for describing an example of setting printing settings (printing conditions) to an extended I/F unit according to an embodiment of the present invention.

FIG. 17 is a schematic diagram for describing an example of setting printing settings (printing conditions) to the extended I/F unit 382 according to an embodiment of the present invention. The application 31 includes an extended I/F calling unit for calling the extended I/F unit 382 and setting printing settings to the UI driver 38. Technically, the settings set to the UI driver 38 are transmission settings. However, in this embodiment, the transmission settings are also referred to as printing settings. Because manufacturers disclose the specifications (API) of the extended I/F unit 382, a third party (i.e. a party or person other than the manufacturers) may generate the extended I/F calling unit 311. Further, manufacturers may generate the extended I/F calling unit 311 or the application 31 including the extended I/F calling unit 311 and provide the generated extended I/F calling unit or the application 31.

The application 31 calls the extended I/F unit 382 of the printer driver 30 by using the extended I/F calling unit 311 (without the intervening of the Windows type OS), and sets a printing setting to the extended I/F unit 382. As described above, data that is not set to the DEVMODE may be, for example, data having high confidentiality. In the example illustrated in FIG. 17, the user name (personal data) and the password are data that are not to be stored in the DEVMODE from the standpoint of security.

The UI driver 38 receives the printing setting set by the application 31 by way of the extended I/F unit 382 and stores the received printing setting in the Language Monitor 32. In this process, an API (Application Programming Interface) of the Windows type OS referred to as "SendRecvvBidiDataFromPort( )" is used. The SendRecvvBidiDataFromPort( ) is described in detail below.

The execution of printing is notified from the application 31 to the render driver 39 via the Windows type OS 10. Because the printing setting is already stored (registered) in the Language Monitor 32, there is no need for the UI driver 38 to display the printing setting screen on the display 19.

By the execution of printing, the printing setting stored in the DEVMODE is transferred (in a state stored in the DEVMODE) to the render driver 39. Further, the render driver 39 obtains the printing setting set with the extended IF unit 382 from the Language Monitor 32. Then, the render driver 39 generates printing data that can be understood by the printer 200.

In this embodiment, printing settings other than those pertaining to security are stored in the DEVMODE and transferred to the render driver 39 via the Windows type OS in a state stored in the DEVMODE. Alternatively, all printing settings may be stored in the Language Monitor 32 by way of the extended I/F unit 382. As illustrated in FIG. 17, no DEVMODE is used in the example of FIG. 17.

Figure 18:
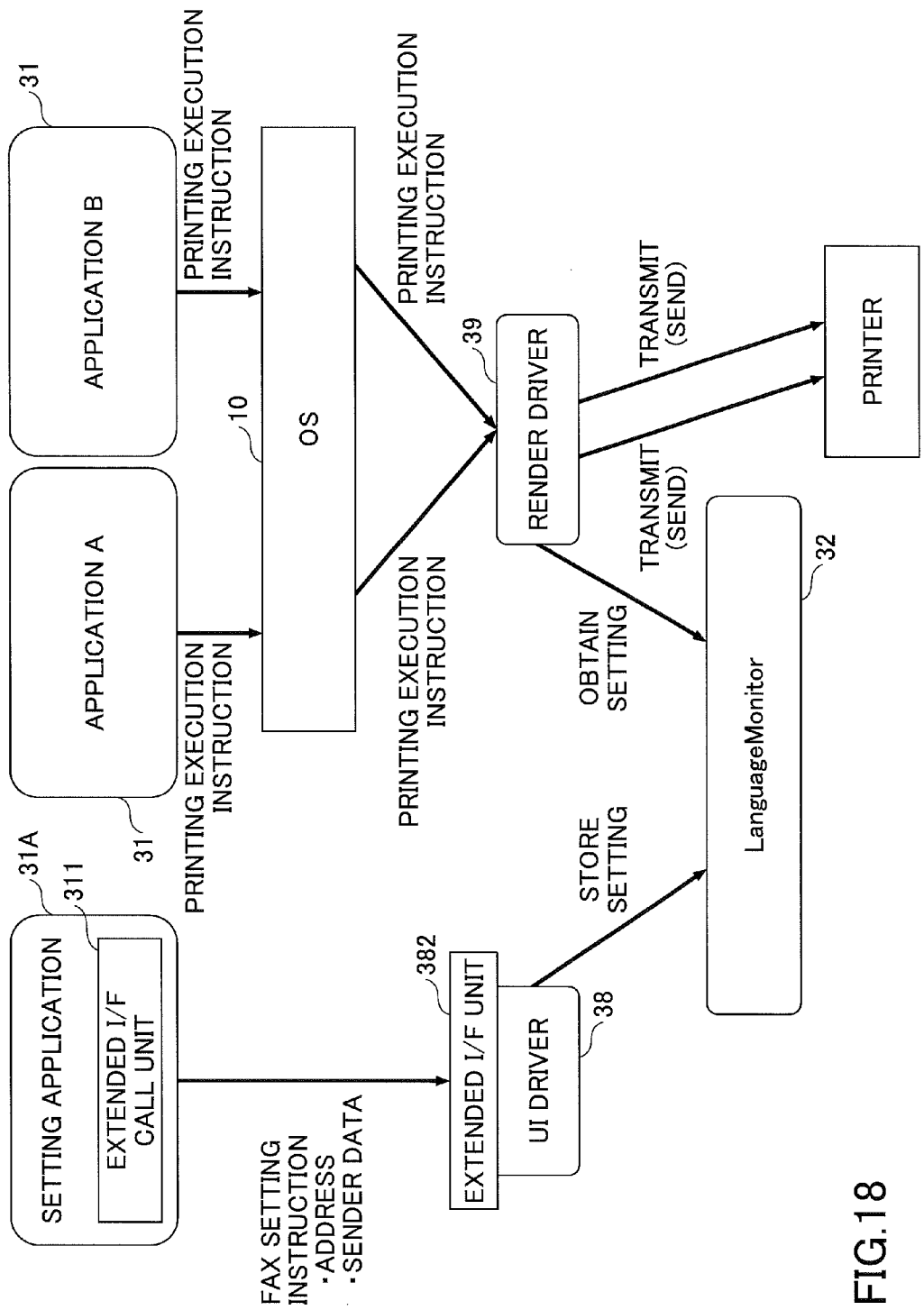
FIG. 18 is a schematic diagram for describing an example of setting a printing setting to an extended I/F unit according to an embodiment of the present invention.

FIG. 18 is a schematic diagram for describing an example of setting a printing setting to the extended I/F unit 382 according to an embodiment of the present invention. FIG. 18 illustrates a setting application 31A which is separate from the application 31 used for generating document data. Similar to the application 31 illustrated in FIG. 17, the setting application 31A includes an extended I/F unit 311 for calling the extended I/F unit 382 and setting a printing setting to the UI driver 38.

In this example, the printing settings that are to be set to the printer driver (PC-FAX driver) 30 include an address (address indicating the destination of facsimile transmission) and sender data (data indicating the sender of the facsimile transmission). The UI driver 38 stores (registers) the printing settings in the Language Monitor 32. That is, the setting application 31A is an application dedicated for printing setting (i.e. setting printing conditions) with respect to the printer driver 30. In FIG. 18, applications A and B are applications 31 that generate document data. The setting application 31A can perform printing setting before document data is generated by the applications (applications A, B) 31.

In a case where the applications 31 instruct execution of printing, the render driver 39 obtains printing settings from the Language Monitor 32, converts the printing settings into data that can be understood by the printer 200, and transmits the converted data to the printer 200.

The setting application 31 illustrated in FIG. 18 may be provided separately from the applications 31 for a purpose other than performing printing setting on the extended I/F unit 382. The setting application 31 may be provided separately from the applications 31 in a case of setting printing conditions to the printer driver 30. In the case of setting printing conditions to the printer driver 30, the setting application 31A may be provided separately from the applications (applications A, B) 31 or form a united body with the applications 31 (i.e. included in the application 31 as illustrated in FIG. 17).

One example of providing the setting application 31A separately from the applications (applications A, B) 31 is a case where the setting application 31A is a form printing application.

[SendRecvvBidiDataFromPort( )]

FIG. 19A is a schematic diagram for describing an example of a format of "SendRecvvBidiDataFromPort( )". A "SendRecvvBidiDataFromPort( )" function is an API loaded in the Language Monitor 32. Similar to the printer driver 30, the Language Monitor 32 includes an I/F determined by the Windows type OS. The "SendRecvvBidiDataFromPort( )" function is one of example of the I/F determined by the Windows type OS. The "SendRecvvBidiDataFromPort( )" function supports bidirectional communication between the application 31 and the printer 200 and bidirectional communication between the application 31 and a print server.

In FIG. 19A "hPort" indicates a handle of a port provided by a module of a calling source. Further, "dwAccessBit" indicates an ACCESS MASK structure (which permits access to a printer or a print server) provided by a module of a calling source. Further, "pAction" indicates a request action provided by a module of a calling source; "pReqData" indicates a pointer of a PBIDI_REQUEST_CONTAINER structure including request data. Further, "ppResData" indicates a pointer to a memory area for receiving an address of a PBIDI_REQUEST_CONTAINER structure including response data.

FIG. 19B is a schematic diagram for describing an example of a format of a "PBIDI_REQUEST_CONTAINER" structure. Although not illustrated in FIG. 19B, the format of a "PBIDI_RESPONSE_CONTAINER" structure is substantially the same as the format of the "PBIDI_REQUEST_CONTAINER" structure. The "PBIDI_REQUEST_CONTAINER" structure is a container for storing a list of "bidi requests" therein. The "PBIDI_RESPONSE_CONTAINER" structure is a container for storing a list of "bidi responses" therein.

The Windows type OS provides Bidi Request and Response schemas which includes a schema of a database including pairs requests and responses that can be used for bidirectional communication between a printer and an application. In FIG. 19B, "version" indicates a version of a schema such as "1". Further, "Flags" indicates a set of flags reserved by a system (Windows type OS). The value of "Flags" is to be 0. Further, "Count" indicates the number of "bidi requests" of an aData member. Further, "aData [ ]" indicates an array (arrangement) of the BIDI_REQUEST_DATA. Each element of the array includes a single "bidi request".

FIG. 19C is a schematic diagram for describing an example of a format of a BIDI_REQUEST_DATA structure. The BIDI_REQUEST_DATA structure includes a single "bidi request". In FIG. 19C, "dwReqNumber" indicates an index of a request. The "dwReqNumber" is used for matching a request of an operation by multi-request with respect to a response. Further, "pSchema" indicates a pointer to a memory location of the first one byte of a schema character string. Further, "data" indicates a BIDI_DATA complying with a schema.

The "SendRecvvBidiDataFromPort( )" function is used for setting conditions to the Language Monitor 32 or for making requests (inquiries) to the Language Monitor 32. The printer driver 30 calls the Language Monitor 32 by way of the "SendRecvvBidiDataFromPort( )", so that the Language Monitor 32 can be used as a storage space. In other words, the data storage unit 321 is provided by the Language Monitor 32 and the SendRecvvBidiDataFromPort( ) function.

As described above, the Language Monitor 32 need not be developed by the manufacturer. A standard Language Monitor 32 can be used together with the Windows type OS. In a case where the Language Monitor 32 is not developed by the manufacturer, the standard Language Monitor 32 is operated. In a case where the manufacturer develops a Language Monitor 32 corresponding to a predetermined I/F, additional functions can be added to the Language Monitor 32. In this embodiment, the printer driver 30 or the like can exchange data with the Language Monitor 32 by using an I/F such as "SendRecvBidiDataFromPort( )".

More specifically, a JOBID is set to a SetSchema( ) of an IBidiRequest (instance of COM interface), and a printing setting is set to SetInputData of an IBidiRequest. In a case where the UI driver 38 sets an IBidiRequest object and calls the SendRecv( ) a spooler calls the SendRecvBidiDataFromPort( ) and sets a printing 3rd setting to a predetermined parameter (e.g., parameter, 4$^{th}$ parameter). Thereby, the printing setting is set to the Language Monitor 32.

In a case of reading out a printing setting with the render driver 39, the printer driver 30, for example, sets an IBidiRequest object and calls the SendRecv( ). Thereby, the printing setting is stored in the IBidiRequest. Accordingly, when the render driver 39 calls a GetOutputData( ) of a IBidiReqeust, the render driver 39 can receive the printing setting stored in the IBidiRequest.

[Operation of Setting Printing (Fax Transmission) Conditions by Way of Extended I/F Unit 382]

Figure 20:
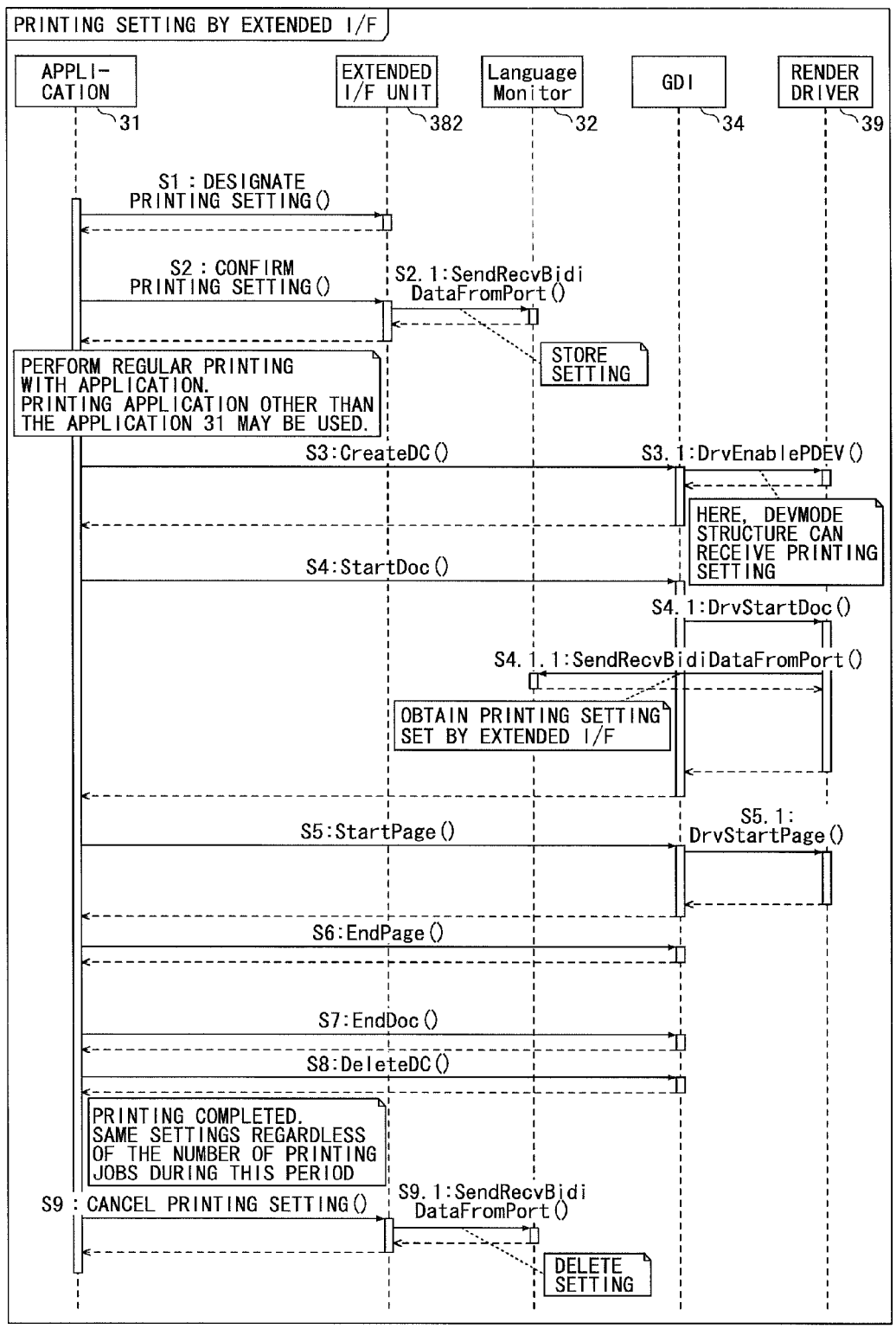
FIG. 20 is a sequence diagram in a case where the application 31 (31A) sets a printing (facsimile transmission) condition to a UI driver by way of an extended I/F unit according to an embodiment of the present invention.

FIG. 20 is a sequence diagram in a case where the application 31 (31A) sets a printing (facsimile transmission) condition to the UI driver 38 by way of the extended I/F unit 382 according to an embodiment of the present invention. Because this operation is performed at the stage of setting printing (facsimile transmission) conditions, the setting application 31A may be provided separately with the application 31 or included in the application 31.

Step S1: The application 31 designates a printing setting to the extended I/F unit 382 of the printer driver 30. In the same manner as the UI driver 38, the application 31 can display a printing setting screen and accept printing settings from the user.

Step S2: The application 31 sends a notification to the extended I/F unit 382 of the printer driver 30 instructing that the designated printing setting is to be confirmed (defined).

Step S2.1: The extended I/F unit 382 of the printer driver 30 instructs the Language Monitor 32 to store the designated printing setting therein. More specifically, the printing setting is stored in a predetermined parameter of the SendRecvBidiDataFromPort( ) function. For the sake of convenience, the sequence diagram of FIG. 20 illustrates the extended I/F unit 382 accessing the Language Monitor 32 in Step S2.1. However, Step S2.1 may be illustrated by showing the UI driver 38 accessing the Language Monitor 32.

Step S3: The application 31 basically performs a typical printing operation on and after Step S3. First, the application 31 instructs the GDI to start preparation for a printing process. More specifically, the application 31 converts the printing setting into a parameter by using the CreateDC( ) function and calls the GDI 34. It is to be noted that the application 31 instructs the GDI to start preparing for a printing process, for example, after a transmission process is completed.

S3.1: The GDI 34 sends the printing process to the printing setting to the render driver 39 by calling the DDI corresponding to the API. The printing setting transferred from the application 31 to the GDI 34 in the form of the parameter of the CreateDC (DEVMODE) is stored in a parameter of DrvEnablePDEV( ) and notified to the render driver 39. Then, the render driver 39 can refer to the printing setting until the job is completed (i.e. until the device context is erased).

S4: When completion of the preparation for the printing process is notified from the GDI 34 to the application 31, the application 31 instructs the GDI 34 to start the printing process. More specifically, the application 31 converts, for example, DocINFO into a parameter by using the StartDoc function and calls the GDI 34.

S4.1: The GDI 34 instructs the render driver 39 to start the printing process. More specifically, the GDI 34 sends the DrvStartDoc( ) function to the render driver 39.

S4.1.1: When the render driver 39 of the printer driver 30 is called with the DrvStartDoc( ) the render driver 39 inquires whether there is a printing setting corresponding to the printing setting set by the application 31. More specifically, the render driver 39 sets a value indicative of an inquiry to a parameter of SendRecvBidiDataFromPort( ) and sends the parameter of the SendRecvBidiDataFromPort( ) to the Language Monitor 32. In a case where the printing setting set by the application 31 exists in the Language Monitor 32, the Language Monitor 32 sets the printing setting to the SendRecvBidiDataFromPort( ) and sends the SendRecvBidi-DataFromPort( ) to the render driver 39.

The render driver 39 of the printer driver 30 generates printing data based on the printing setting obtained from the Language Monitor 32 (and also based on a DEVMODE if a printing setting is stored in the DEVMODE) and transmits the generated printing data to the printer 200.

S5: When the GDI 34 notifies the completion of starting the printing process to the application 31, the application 31 repeats the following processes in page units (i.e. page by page). First, the application 31 instructs the GDI 34 to accept printing data of a new page. More specifically, the application 31 sends StartPage( ) to the GDI 34.

S5.1: The GDI 34 sends DrvStartPage( ) to the render driver 39.

Then, the GDI 34 sends a render function (document data) obtained from the application 31 to the render driver 39. Then, the render driver 39 converts the document data into printing data in accordance with the obtained printing setting(s). Then, the render driver 39 transmits the printing data to the printer 200.

S6: When the GDI 34 notifies completion of a rendering process of 1 page (a single page worth of rendering) to the application 31, the application 31 notifies completion of writing of 1 page (a single page worth of writing) to the GDI 34. More specifically, the application 31 sends EndPage( ) to the GDI 34.

S7: In a case where the rendering process of all the pages is completed, the application 31 notifies the completion of a printing job to the GDI 34. More specifically, the application 31 sends EndDoc( ) to the GDI 34.

S8: The application 31 notifies the DeleteDC( ) to the GDI 34 and erases the device context.

At this stage, if the application 31 instructs starting of a printing process again, the render driver 39 generates printing data with the same printing settings as the previous printing process because the printing setting of the Language Monitor 32 is not yet changed.

S9: After the printing process is completed, the application 31 notifies that the printing setting is to be cancelled to the extended I/F unit 382 of the printer driver 30.

S10: The extended I/F unit 382 of the printer driver 30 sets a value indicating the cancellation to a parameter of the SendRecvBidiDataFromPort( ). Then, the extended I/F unit 382 (UI driver 38) instructs the Language Monitor 32 to cancel (nullify) the printing setting.

In Step S2.1 of FIG. 20, the printing setting (printing condition) is set by performing communication a single time. However, the printing setting may be set by performing communication multiple times. Similarly, in Step 4.1.1, data may be read out not only by performing communication a single time but by performing communication multiple times. Further, the process of Step S2.1 may be performed in Step S1.

As illustrated in FIG. 20, the render driver 39 of the printer driver 30 obtains setting data (printing settings) of the extended I/F unit 382 from the Language Monitor 32 when DrvStartDoc( ) is called.

As described above, an operation sequence and a process of the Windows type OS are different between the RAW spool and the EMF spool. However, the manner of accessing the Language Monitor 32 is the same between the RAW spool and the EMF spool even if the printer driver operates differently with respect to the RAW spool and the EMF spool.

Therefore, the render driver 39 is to be designed so that the Language Monitor 32 can obtain the printing settings at the timing of DrvStartDoc( ). That is, the process of the printer driver 30 need not be designed with consideration of spool type. Thus, by performing the same processes at the same DDI, the Language Monitor 32 can be used regardless of the difference of spool type.

As described above with reference to FIG. 20, the printer driver 39 obtains the printing setting from the Language Monitor 32 when the DrvStartDoc( ) is called. However, the printer driver 39 may obtain the printing setting at other timings as long as the timing is before generating the printing data to be transmitted to the printer 200.

[Transmission Operation after Printing Setting (Operation Setting) is Set]

In a case where the user sets printing settings (printing conditions) by operating the setting application 31A, the user can also set an operation setting (operation condition). The operation setting is an item included in a printing setting. In this embodiment, the operation setting is a setting (condition) that designates an operation or a process performed by the printer 200.

Figure 21:
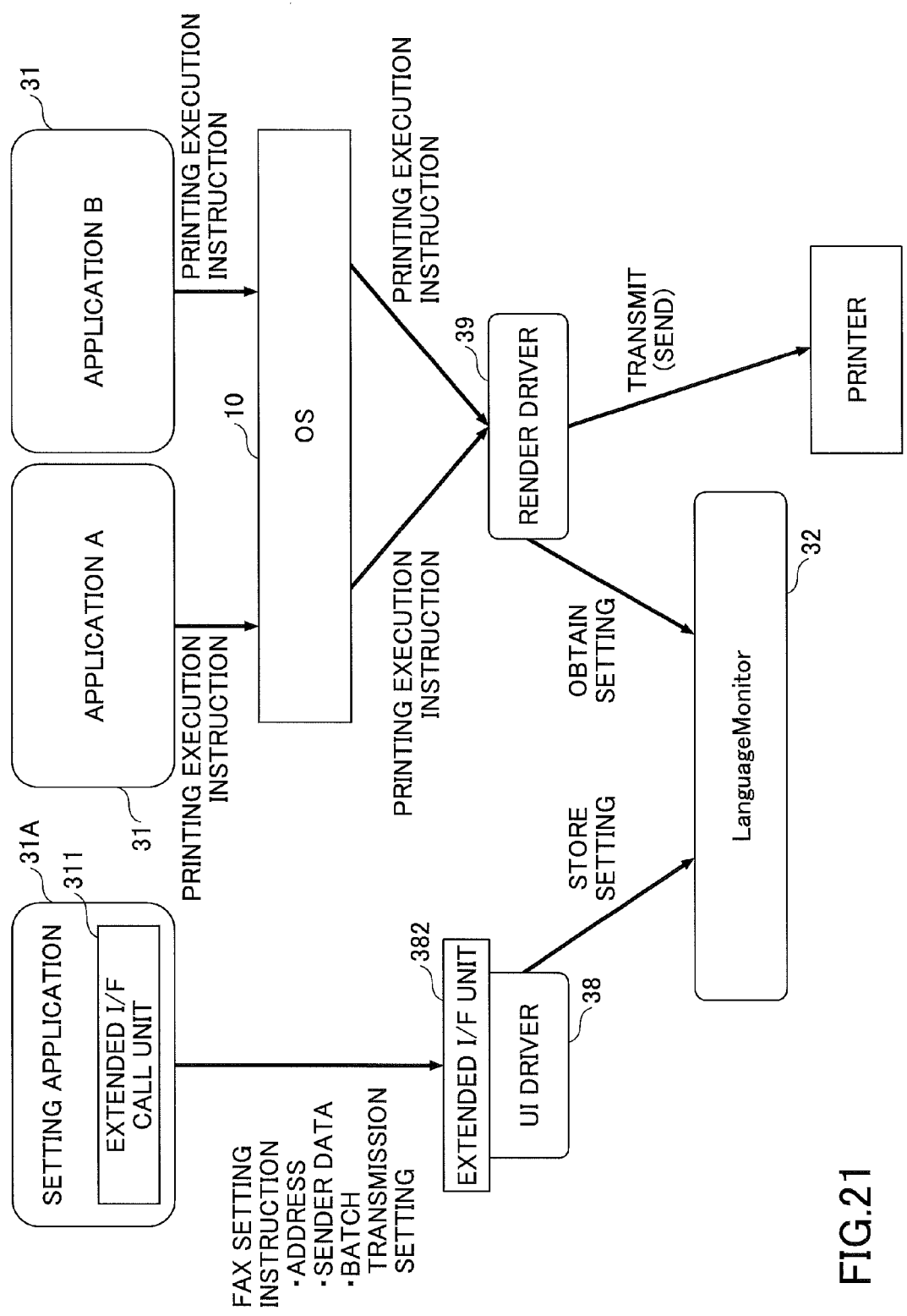
FIG. 21 is a schematic diagram for describing an example of setting a printing setting to an extended I/F unit according to an embodiment of the present invention.

FIG. 21 is a schematic diagram for describing an example of setting a printing setting to the extended I/F unit 382. The example of FIG. 21 is different from the example of FIG. 18 in that the setting application 31A is a printing condition and an operation to the UI driver 38. Other aspects (e.g., the extended I/F unit 382 included in the UI driver 38) of the example of FIG. 21 are substantially the same as those of FIG. 17.

The setting application 31A of FIG. 21 sets an operation setting as follows.

Operation Setting: Batch Transmission Setting

In a case of performing facsimile transmission for sending plural documents from a printer, a connection fee is be charged each time an application instructs execution of printing. Therefore, connection fees can be saved by transmitting data of all of the documents in a single connection rather than repeating connection and disconnection. The "batch transmission setting" is an operation setting used for the purpose of, for example, saving connection fees. The batch transmission setting is a setting that instructs the render driver 39 to perform an operation of transmitting data of documents (jobs) from plural applications in a batch.

In FIG. 21, in a case where a printing setting for facsimile transmission is accepted, the setting application 31A sets a printing setting to the UI driver 38. Then, the setting application 31A sets a printing setting for facsimile transmission (e.g., address data, sender name) and an operation setting (in this example, batch transmission setting) by way of the extended I/F unit 382 of the printer driver 30.

After the batch transmission setting is set to the UI driver 38, a printing process is executed by the applications (A, B) 31. Thereby, the render driver 39 reads out the printing setting and the operation setting from the Language Monitor 32 and generates printing data that can be understood by the printer 200. Then, in accordance with the batch transmission setting, the render driver 39 transmits the printing data to the printer 200 in a batch. Accordingly, fax transmission with respect to the same address (destination) can be performed with a single connection.

The applications (A, B) 31 may separately or together transmit data of plural documents in a batch.

In FIG. 21, the setting application 31A may constitute a united body with the applications (A, B) 31. As another example, there is an operation setting that allows the same document to be transmitted to multiple addresses (broadcasting).

Figure 22:
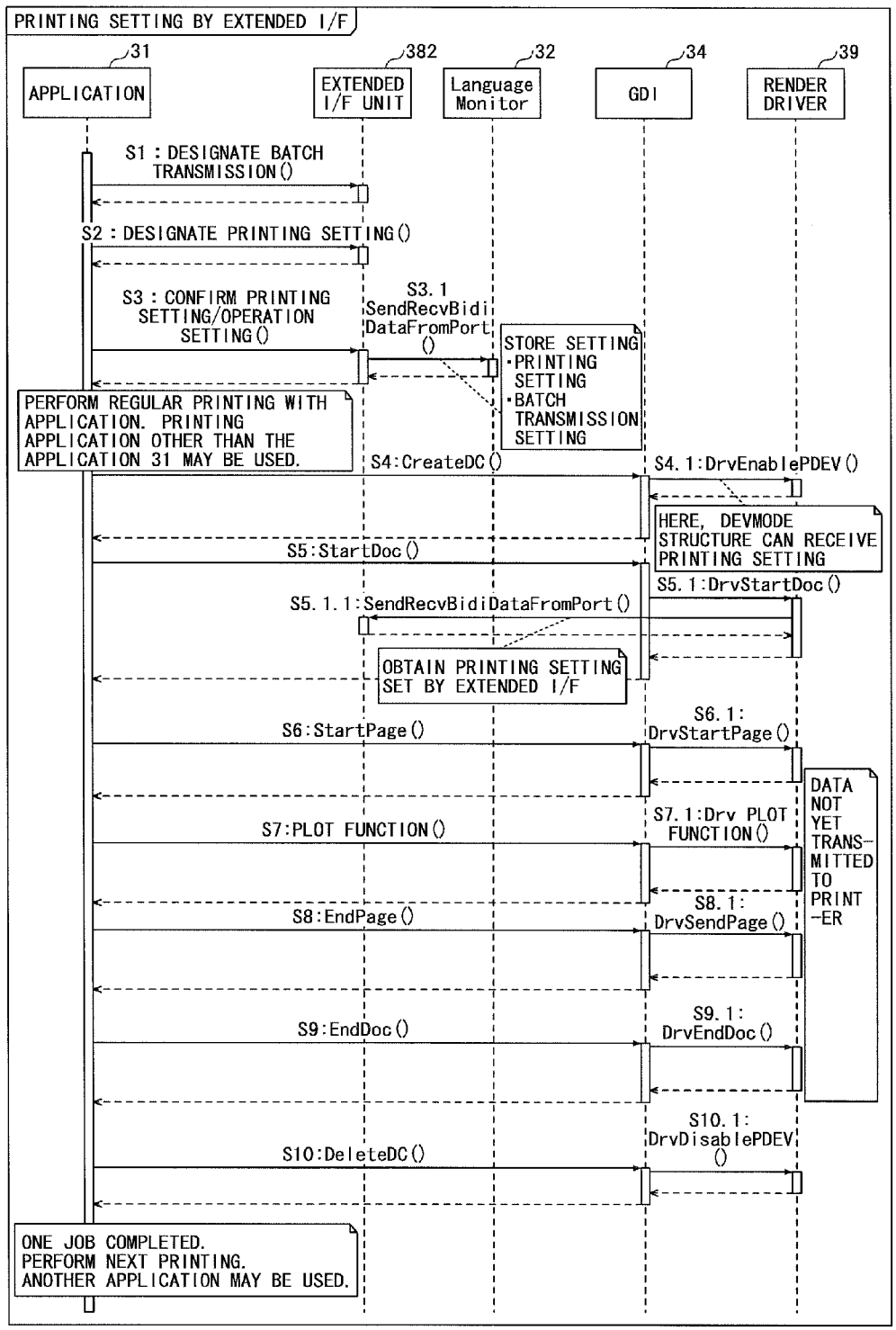
FIGS. 22-24 are schematic diagrams for describing an operation of batch transmission according to an embodiment of the present invention.
Figure 23:
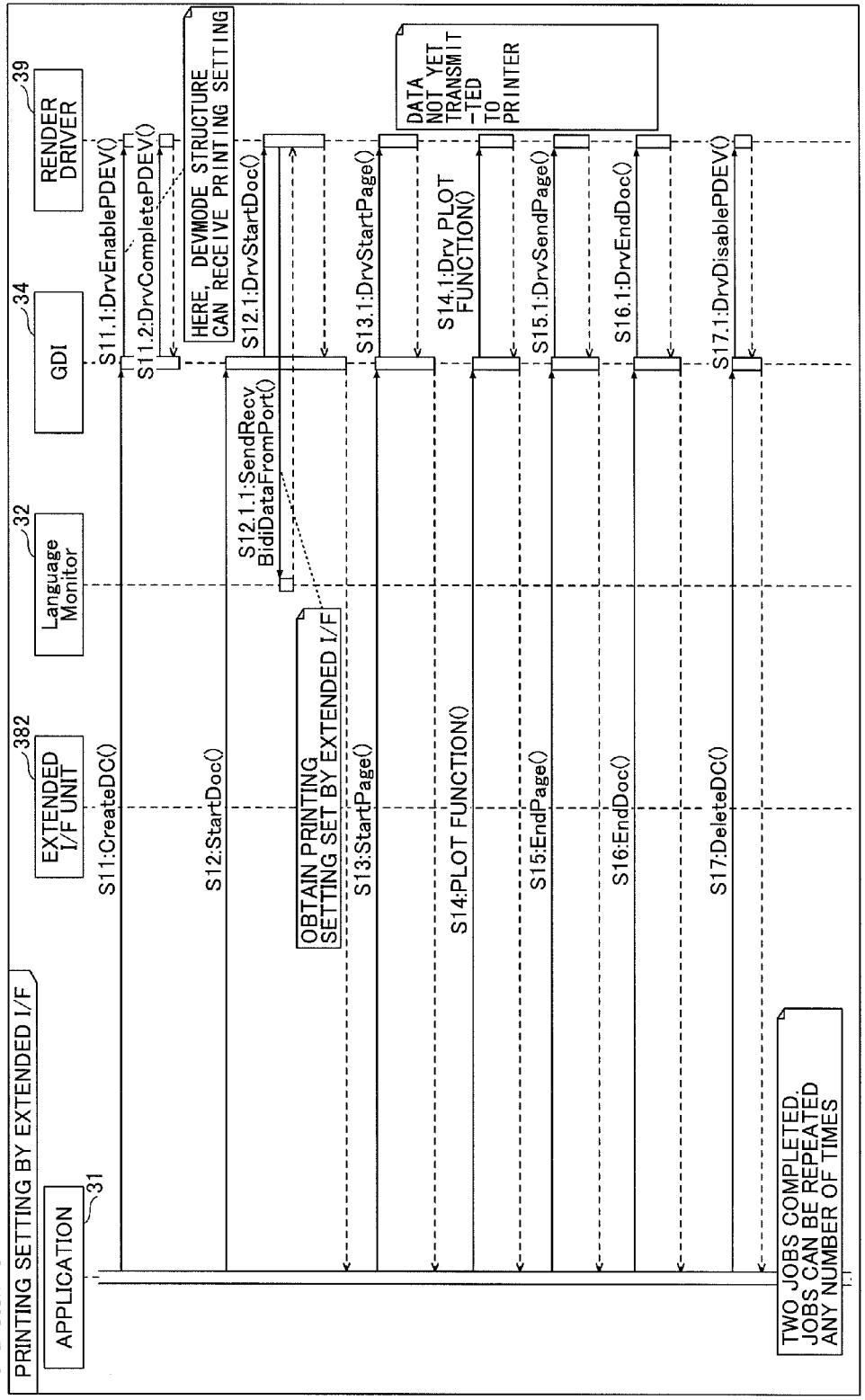
Figure 24:
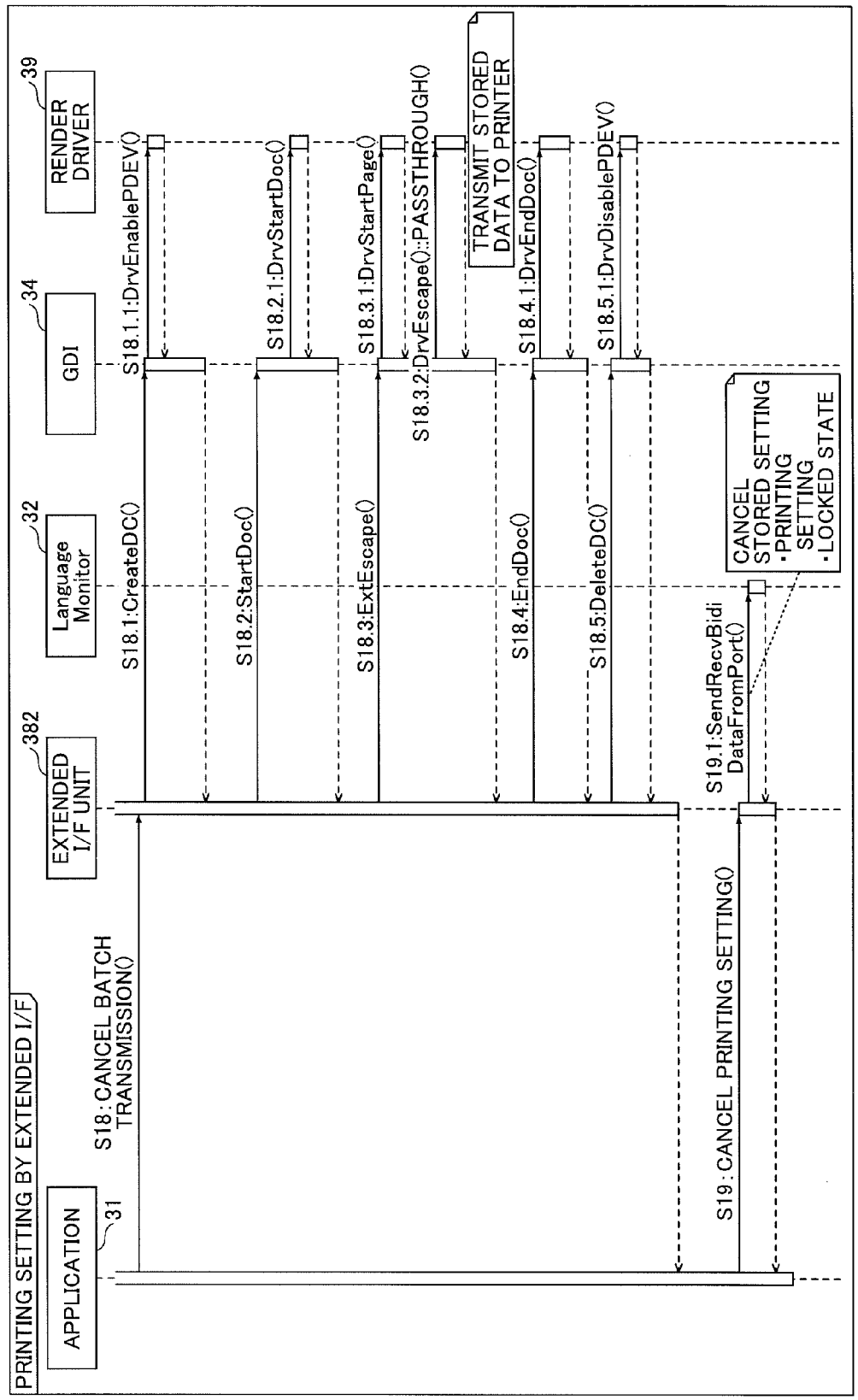

FIGS. 22-24 are schematic diagrams for describing an operation of batch transmission. In FIGS. 21-24, the setting application 31A and the applications (A,B) 31 are collectively referred to as "application 31".

S1: The application 31 sets an operation setting to the extended I/F unit 382 of the printer driver 30. In the same manner as the UI driver 38, the application 31 can display an operation setting screen on the display 19. Further, the application 31 can accept an operation setting from the user.

S2: Then, the application 31 sets a printing setting to the extended I/F unit 382 of the printer driver 30.

S3: The application 31 sends a notification to the extended I/F unit 382 of the printer driver 30 instructing that the designated printing setting and operation are to be confirmed (defined).

Step S3.1: The extended I/F unit 382 of the printer driver 30 instructs the Language Monitor 32 to store the designated printing setting and operation setting therein. More specifically, the printing setting and the operation are stored in predetermined parameters of the SendRecvBidiDataFromPort( ) function. Because the operation setting is to be maintained (stored) until the operation setting is erased, the operation setting is in a Lock state.

Step S4: The application 31 basically performs a typical printing operation on and after Step S4. First, the application 31 instructs the GDI 34 to start preparation for a printing process. More specifically, the application 31 converts the printing setting into a parameter by using the CreateDC( ) function and calls the GDI 34.

S4.1: The GDI 34 sends the printing process to the printing setting to the render driver 39 by calling the DDI corresponding to the API. The printing setting transferred from the application 31 to the GDI 34 in the form of the parameter of the CreateDC (DEVMODE) is stored in a parameter of DrvEnablePDEV( ) and notified to the render driver 39. Then, the render driver 39 can refer to the printing setting until the job is completed (i.e. until the device context is erased).

S5: When completion of the preparation for the printing process is notified from the GDI 34 to the application 31, the application 31 instructs the GDI 34 to start the printing process. More specifically, the application 31 converts, for example, DocINFO into a parameter by using the StartDoc( ) function and calls the GDI 34.

S5.1: The GDI 34 instructs the render driver 39 to start the printing process. More specifically, the GDI 34 sends the DrvStartDoc( ) function to the render driver 39.

S5.1.1: When the render driver 39 of the printer driver 30 is called with the DrvStartDoc( ) the render driver 39 inquires whether there is a printing setting and an operation setting corresponding to the printing setting and the operation setting set by the application 31. More specifically, the render driver 39 sets a value(s) indicative of an inquiry to a parameter(s) of SendRecvBidiDataFromPort( ) and sends the parameter(s) of the SendRecvBidiDataFromPort( ) to the Language Monitor 32. In a case where the printing setting and the operation setting set by the application 31 exists in the Language Monitor 32, the Language Monitor 32 sets the printing setting and the operation setting to the SendRecvBidiDataFromPort and sends the SendRecvBidiDataFromPort( ) to the render driver 39.

The render driver 39 of the printer driver 30 generates printing data based on the printing setting obtained from the Language Monitor 32 (and also based on a DEVMODE if a printing setting is stored in the DEVMODE) and transmits the generated printing data to the printer 200.

S6: When the GDI 34 notifies the completion of starting the printing process to the application 31, the application 31 repeats the following processes in page units (i.e. page by page). In the example of FIG. 22, only a single page is printed. First, the application 31 instructs the GDI 34 to accept printing data of a new page. More specifically, the application 31 sends StartPage( ) to the GDI 34.

S6.1: The GDI 34 sends DrvStartPage( ) to the render driver 39.

S7: Then, the GDI 34 sends a render function (document data) obtained from the application 31 to the render driver 39. Then, the render driver 39 converts the document data into printing data in accordance with the obtained printing setting(s). In a case where the batch transmission setting is not set, the render driver 39 generates printing data in accordance with the printing setting obtained from the Language Monitor 32 and transmits the printing data to the printer 200. However, in a case where the render driver 39 detects the batch transmission setting being set, the render driver 39 maintains (stores) the printing data and does not yet transmit the printing data.

S8: When the GDI 34 notifies completion of a rendering process of 1 page (a single page worth of rendering) to the application 31, the application 31 notifies completion of writing of 1 page (a single page worth of writing) to the GDI 34. More specifically, the application 31 sends EndPage to the GDI 34.

S8.1: The GDI 34 transmits the DrvSendPage( ) to the render driver 39.

S9: In a case where the rendering process of all the pages is completed, the application 31 notifies the completion of a printing job to the GDI 34. More specifically, the application 31 sends EndDoc( ) to the GDI 34.

S9.1: The GDI 34 transmits DrvEndDoc( ) to the render driver 39.

S10: The application 31 notifies DeleteDC( ) to the GDI 34 and erases the device context.

S10.1: The GDI 34 transmits DrvDisiblePDEV to the render driver 39. Then, the render driver 39 erases DEVMODE.

At this stage, execution of 1 Job is completed (data transmission of a single document is completed). In batch transmission, the application executes next Job without transmitting the printing data to the printer 200.

The processes in Steps S11-S17 are substantially the same as those of Steps S4-S10. The application 31 can repeat the processes in S4-S10 any number of times. However, in this embodiment, data of two Jobs (two document data) are transmitted in a batch.

S18: The application 31 instructs the batch transmission setting to be cancelled to the extended I/F unit 382 of the printer driver 30. For example, in a case where document data of plural documents (transmission object) are registered by the user, the application 31 instructs cancellation of the batch transmission setting after all of the document data have been transmitted. Thus, in some cases, it may be preferable for the application 31 (that generates document data) and the setting application 31A (that sets a printing settings/operation setting) to constitute a united body.

In a case where the application 31 and the setting application 31A are separate (i.e. do not constitute a united body), the application 31 may cancel the batch transmission setting according to an operation by the user. Alternatively, the cancellation of the batch transmission setting may be performed automatically. For example, the batch transmission setting may be cancelled after a predetermined period elapses after the batch transmission setting is set or when a specific time.

S18.1: The extended I/F unit 382 basically performs a typical printing operation on and after Step S18.1. Alternatively, the application 31 may perform the typical printing operation on and after Step S18.1 instead of the extended I/F unit 382.

First, the extended I/F unit 382 instructs the GDI 34 to start preparation for a printing process. More specifically, the extended I/F unit 382 converts the printing setting into a parameter by using the CreateDC( ) function and calls the GDI 34.

Step 18.1.1: The GDI 34 sends the printing process to the printing setting to the render driver 39 by calling the DDI corresponding to the API. The printing setting transferred from the extended I/F unit 382 to the GDI 34 in the form of the parameter of the CreateDC (DEVMODE) is stored in a parameter of DrvEnablePDEV( ) and notified to the render driver 39. However, because document data is not transmitted, the render driver 39 is unable to generate printing data by referring to DEVMODE.

S18.2: When completion of the preparation for the printing process is notified from the GDI 34 to the extended I/F unit 382, the extended I/F unit 382 instructs the GDI 34 to start the printing process. More specifically, the extended I/F unit 382 converts, for example, DocINFO into a parameter by using the StartDoc( ) function and calls the GDI 34.

S18.3: The extended I/F unit 382 transmits ExtEscape( ) to the GDI 34. The ExtEscape( ) function is an API for allowing access to a module unable to make access by way of the GDI 34 (in this example, the render driver 39). The ExtEscape( ) function can be utilized in a case of transmitting data from an application or the like to a driver without the intervention of the GDI 34 or in a case of obtaining data from a driver without the intervention of the GDI 34. The ExtEscape( ) may include a request for transmitting accumulated (stored) printing data to the printer 200.

S18.3.1: GDI 34 converts ExtEscape( ) into a DDI, that is, DrvStartPage( ) and transmits the DrvStartPage( ) to the render driver 39.

S18.3.2: Further, the GDI 34 transmits DrvEscape( )::PASSTHROUGH( ) to the render driver 39. In accordance with the instruction in DrvEscape( )::PASSTHROUGH( ) the render driver 39 transmits the accumulated printing data to the printer 200.

S18.4: In a case where the extended I/F unit 382 is notified from the GDI 34 that the printing data has been transmitted, the extended I/F unit 382 notifies completion of a printing job to the GDI 34. More specifically, the extended I/F unit 382 sends EndDoc( ) to the GDI 34.

S18.4.1: The GDI 34 transmits DrvEndDoc( ) to the render driver 39.

S18.5: The extended I/F unit 382 notifies DeleteDC( ) to the GDI 34 and erases the device context.

S18.5.1: The GDI 34 transmits DrvDisiblePDEV to the render driver 39. Then, the render driver 39 erases DEVMODE.

S19: When the application 31 is notified that operation is completed from the extended I/F unit 382, the application 31 instructs the extended I/F unit 382 of the printer driver 30 to cancel the printing setting.

S19.1: The extended I/F unit 382 of the printer driver 30 sets a value indicating the cancellation to a parameter of the SendRecvBidiDataFromPort( ). Then, the extended I/F unit 382 instructs the Language Monitor 32 to cancel (nullify) the printing setting. Thereby, the extended I/F unit 382 erases the printing setting and the operation setting stored in the Language Monitor 32. Accordingly, the locked state of the operating is cancelled.

Accordingly, designation of an operation (operation setting) of the printer driver 30 can be registered in the Language Monitor 32 even if the operation setting is an item that is not stored in a DEVMODE.

In Step S18, the extended I/F unit 382 of the printer driver 30 transmits an instruction (notice) to cancel the batch transmission setting to the render driver 39 via the GDI 34 (regular printing job). Alternatively, the extended I/F unit 382 may transmit the instruction directly to the render driver 39.

[Identification of Multiple Logical Printers]

In some case, multiple logical printers may be registered in a single client PC. In this embodiment, a logical printer is a logical printer indicated as an icon of a printer in a printer folder of a Windows type OS. The Windows type OS can generate multiple logical printers with respect to a single printer driver 30. The logical printer is a virtual output destination from the standpoint of the application 31. The printing data rendered by the printer driver 30 is output to a logical printer(s) designated by the user and transferred from the logical printer(s) to a physical printer(s) by way of the Windows type OS.

A name can be assigned to each logical printer. For example, the name can be assigned to the logical printer by the user or automatically assigned in correspondence with the name of a package of a printer driver. For example, a setting indicating a function, a setting indicating whether a printer is shared, a setting indicating a spool type, or a setting indicating an option configuration may be set to the logical printer. In other words, the initial settings of a single physical printer can be changed.

In a case where multiple logical printers are registered in a single client PC, it is convenient to set printing settings and operation settings with respect to each of the logical printers. In one configuration, the same printing setting is used by multiple applications 31 after setting the printing setting once by the extended I/F unit 382. In another configuration, the same operation setting is used by multiple applications 31 after the setting the operation setting once by the extended I/F unit 382.

It is desired for the printing settings and the operation settings to be stored with respect to each logical printer. Accordingly, the extended I/F unit 382 registers printing settings and operation settings in the Language Monitor 32 by using a logical printer name (hereinafter also referred to as "logical printer ID") as a key.

Figure 25:
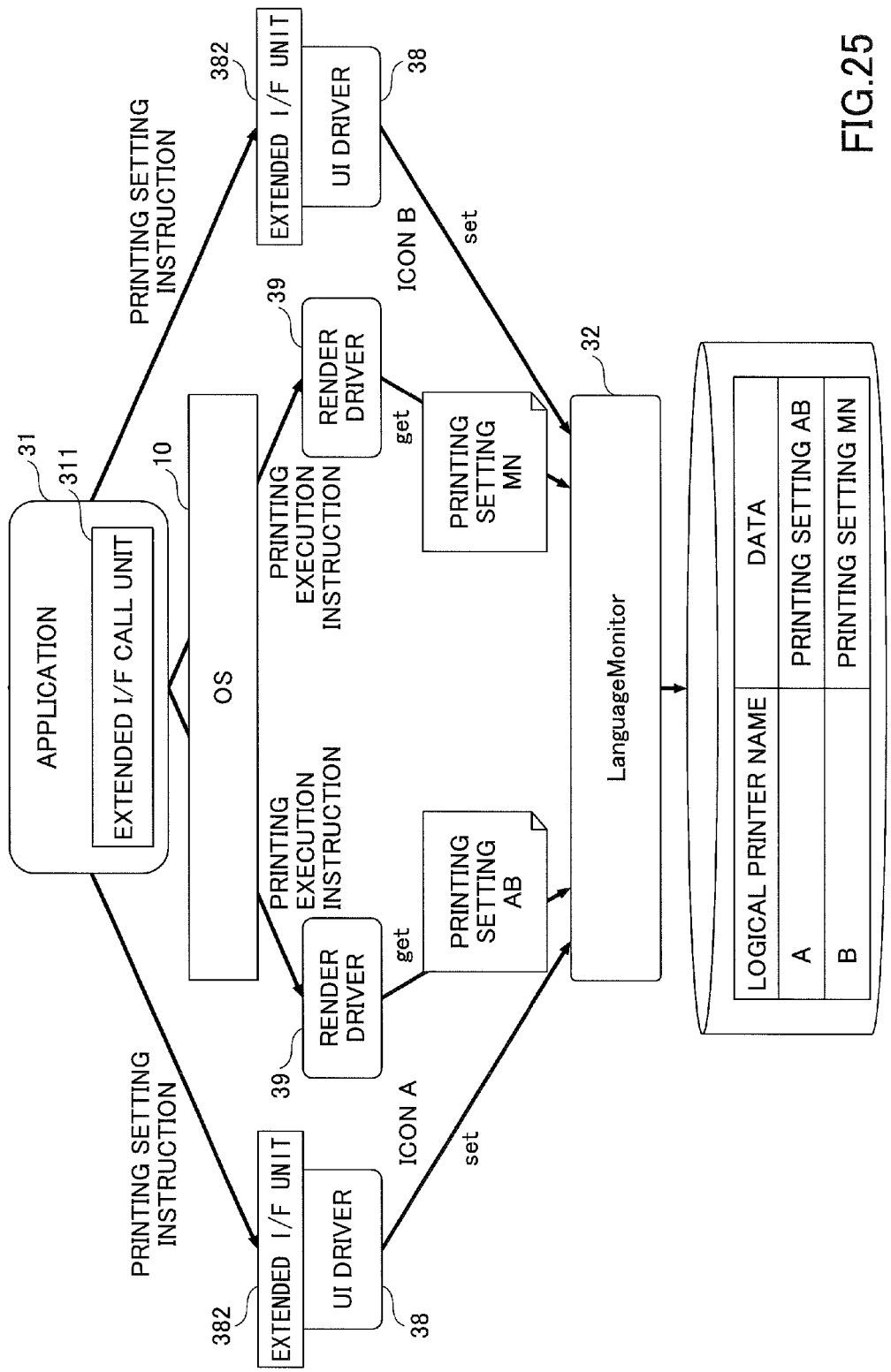
FIG. 25 is a schematic diagram for describing an example of an operation of setting a printing setting with respect to multiple logical printers according to an embodiment of the present invention.

FIG. 25 is a schematic diagram for describing an example of an operation of setting a printing setting with respect to multiple logical printers. In a case where multiple logical icons (logical printers) are registered in a single client PC 100, a printing setting(s) is registered in the Language Monitor 32 using the logical printer ID as a key.

The application 31 of FIG. 25 is an example of a united body constituted by the above-described setting application 31A, and applications (A, B) 31. As described below, the application 31 uses the extended I/F unit 382 of the printer driver 30.

In this example, the application 31 sets a printing setting AB to the logical printer name (logical printer ID) A, and the application 31 sets a printing setting MN to the logical printer name (logical printer ID) B.

The logical printer ID is an ID of a logical printer designated as an output destination by the user. Accordingly, the logical printer ID (to which reference is to be made) is detected by the application 31, the UI driver 38, and the render driver 39. Therefore, the UI driver 38 can set a printing setting to the Language Monitor 32 by using the logical printer ID (corresponding to the logical printer of the output destination) as a key. The render driver 39 can inquire the Language Monitor 32 by using the logical printer ID as a key and obtain a printing setting corresponding to the inquiry.

Accordingly, a printing setting or an operation setting can be designated with respect to each logical printer and facilitate printing and facsimile transmission. It is to be noted that a printing setting/operation setting can be set with respect to each logical printer even in a case of performing batch transmission.

[Language Monitor with Point & Print Installing Method]

Next, a method of managing printing settings and operation settings using the Language Monitor 32 with Point & Print installing method.

Figure 26:
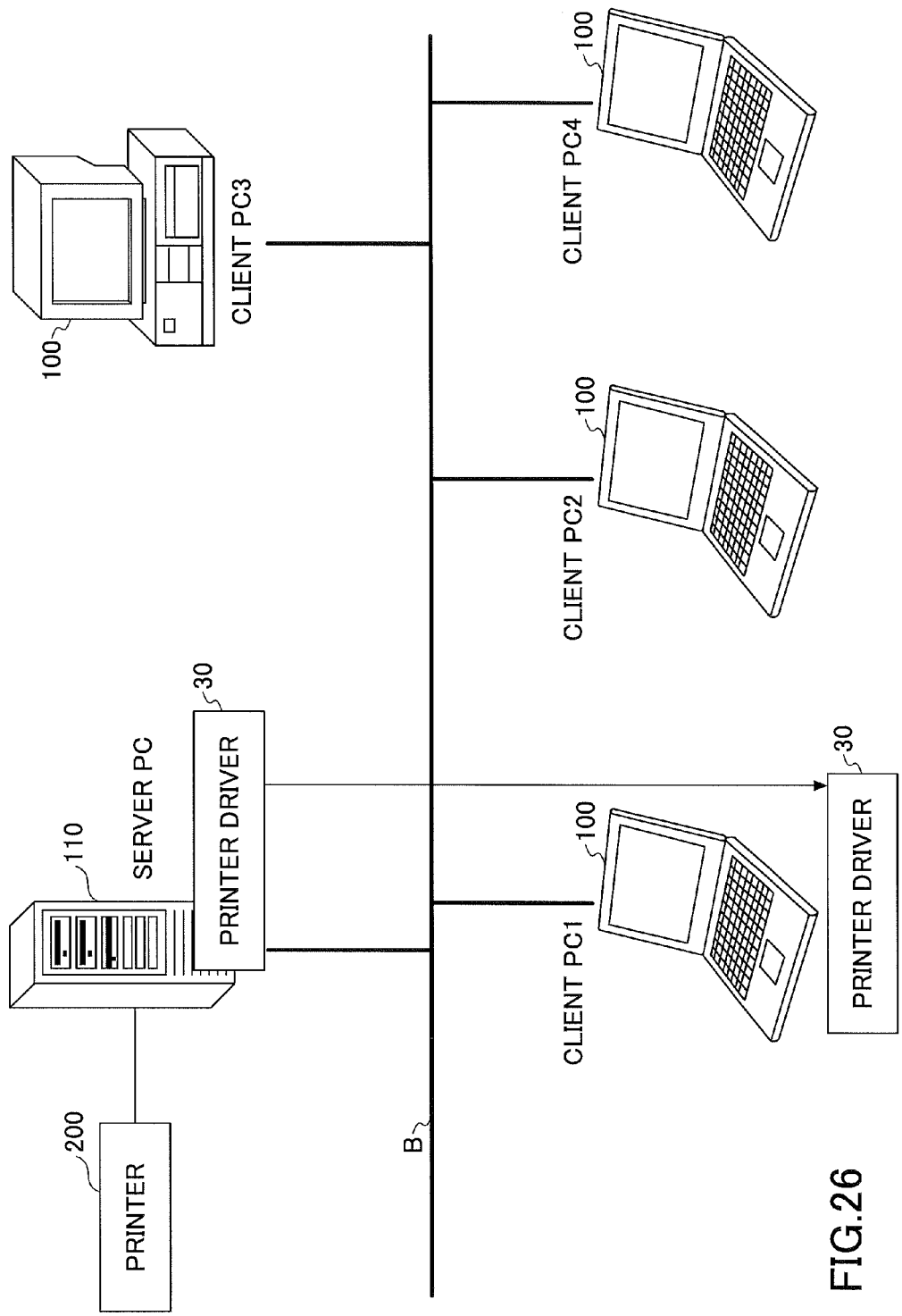
FIG. 26 is a schematic diagram illustrating a configuration of a printing system having a Point & Print environment according to an embodiment of the present invention.

FIG. 26 is a schematic diagram illustrating a configuration of a printing system 400 having a Point & Print environment. In the printing system 400, four client PCs 100 are connected to a server PC 110 via a network B. Although the printer 200 is connected to the server PC 110 in FIG. 26, the printer 200 may be connected to the network B.

The printer driver 30 is installed in the server PC 110. The server PC 110 copies the printer driver 30 and distributes the copies to the client PCs 100. Therefore, by the cooperative operation between the server PC 110 and the client PCs 100, the printer driver 30 can be installed without burdening the user. The following example is a case where the client PC 100 has connected to the server PC 110 and installed the printer driver 30 with the Point & Print installing method.

In performing rendering on the server side of a Point & Print environment, it may be difficult for a printing setting or the like to be shared by the server PC 110 and the client PC 100 because a printing setting set by the user is accepted by the client PC (in this example, client PC1) 100.

However, because the above-described Language Monitor 32 is a function (functional component) inside the Windows type OS, the Windows type OS of the client PC1 100 having Point & Print installed therein can transmit the printing setting to the server PC 110. Accordingly, the server PC 110 can obtain printing settings and operation settings from the client PC 1 by way of the printing architecture of the Windows type OS.

Figure 27:
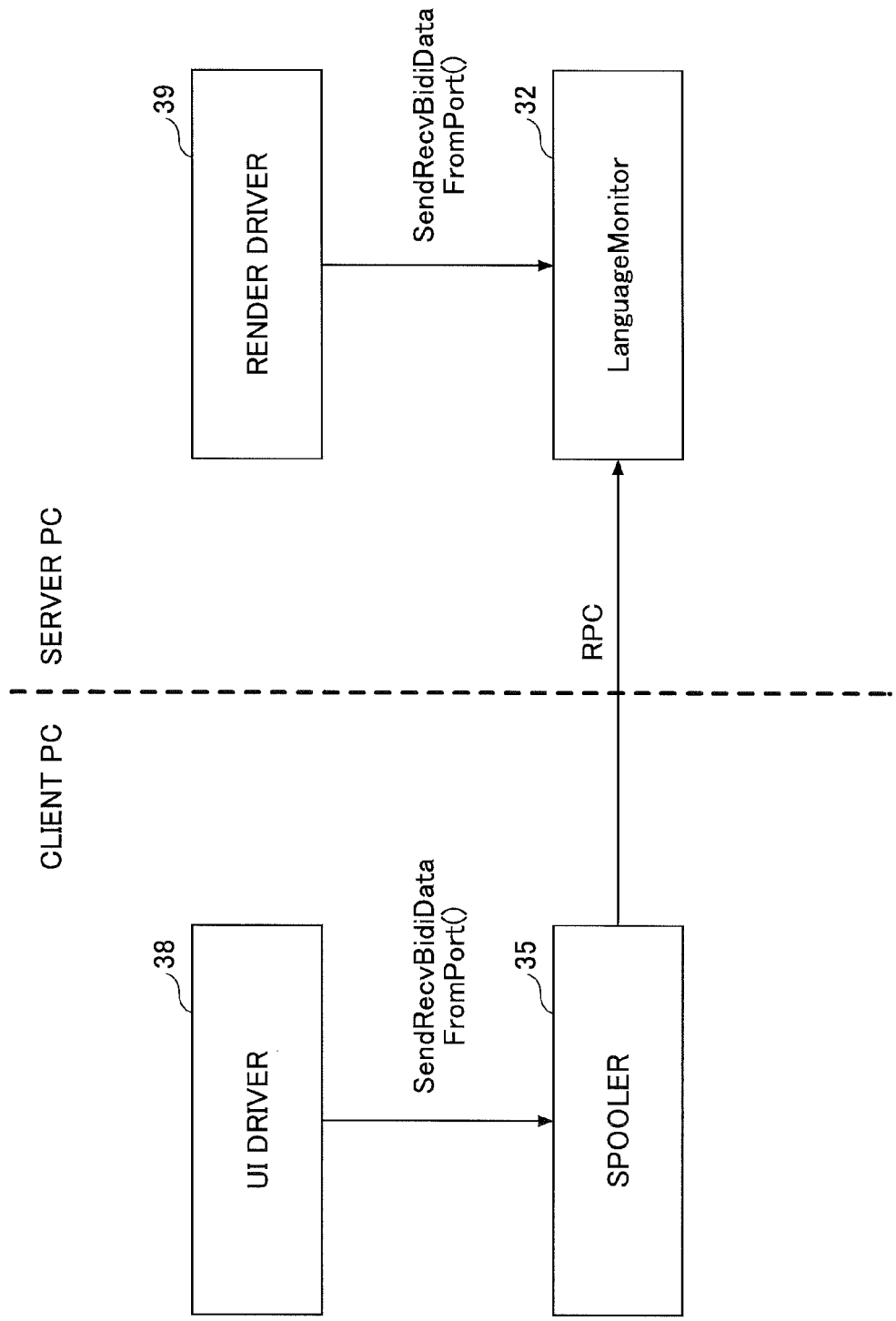
FIG. 27 is a schematic diagram for describing an example of an operation of a Language Monitor in a Point & Print environment according to an embodiment of the present invention.

FIG. 27 is a schematic diagram for describing an example of an operation of the Language Monitor 32 in a Point & Print environment. The Language Monitor 32 is a module installed in the printing architecture of the Windows type OS. Therefore, even in a case where a process of the UI driver 38 is assigned to the client PC 100 or a case where a process of the render driver 39 is assigned to the server PC 110 in the Point & Print environment, only the Language Monitor 32 provided on the side of server PC is allowed to function. Although the Language Monitor 32 is also provided on the side of the client PC 100, the Language Monitor 32 of the client PC side does not function.

The printer driver 30 of the client PC 1 and the printer driver 30 of the server PC 110 are configured to access only one Language Monitor 32.

The Windows type OS of the client PC1 100 and the Windows type OS of the server PC 110 establish communications between the client PC1 100 and the server PC 110 by using, for example, RPC (Remote Procedure Call). In a case where the UI driver 38 accesses the Language Monitor 32 of the client PC1 100, the Language Monitor 32 of the client PC1 100 does not operate but a spooler 35 of the client PC transmits a printing setting to the Language Monitor 32 of the server PC 110.

Because the same Windows type OS is installed in the client PC1 100 and the server PC 110, both the client PC1 and the server PC 110 can share the use of the Language Monitor 32 of the printing architecture of the Windows type OS. Accordingly, problems such as access restrictions or communication error due to modules uniquely developed by different manufacturers can be prevented. Further, because the same Windows type OS is installed in the client PC1 100 and the server PC 110, the client PC1 100 and the server PC 110 have affinity to the Windows type OS.

Although RAW spool and EMF spool are included as the spool types in the Point & Print environment, rendering cannot be performed on the server side (server side rendering) in a case where RAW spool is used as the spool type. This is because RAW spool being a process of the application 31 restricts the location in which rendering can be performed.

Otherwise, the Language Monitor 32 can be used for performing client side rendering with the RAW spool type, client side rendering with the EMF spool type, and server side rendering with the EMF spool type as illustrated in FIG. 27.

[Case of a 32 Bit Application Operating in a 64 Bit OS]

Figure 28:
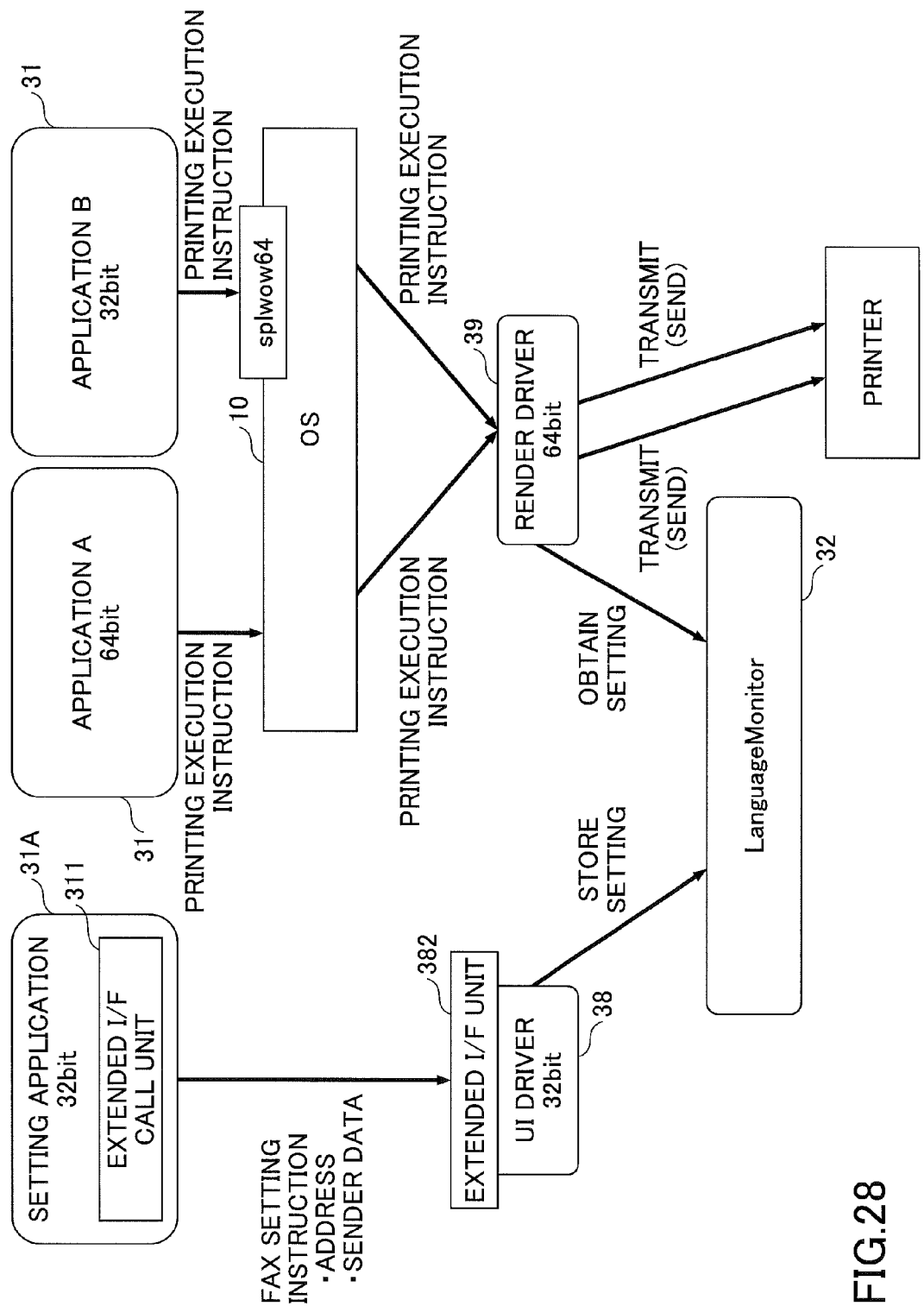
FIG. 28 is a schematic diagram for describing example of an operation of a Language Monitor in a case where a 32 bit application is operated in a 64 bit OS according to an embodiment of the present invention.

FIG. 28 is a schematic diagram for describing example of an operation of the Language Monitor 32 in a case where a 32 bit application is operated in a 64 bit OS.

In the following, it is assumed that the setting application 31A that sets printing settings for facsimile transmission is a 32 bit application, and the Windows type OS is a 64 bit OS.

When the application 31 executes a printing process, splwow64.exe operates according to a WOW 64 scheme. Therefore, the application 31 may either be a 32 bit application or a 64 bit application. Similar to the Windows type OS, the printer driver 30 is also to be designed with 64 bits. Thus, the render driver 39 is a 64 bit driver.

The UI driver 38 is also provided as a 64 bit driver and is installed in the client PC1 100. However, in a case where the setting application 31A (32 bit application) attempts to access the extended I/F unit 382, splwow64.exe does not operate. Therefore, the setting application 31A cannot access the extended I/F unit 382.

In such a case, the Windows type OS registers a 32 bit printer driver (which is registered beforehand as a compatible substitute of a 64 bit printer driver) to a system of the client PC1 100 by using a scheme referred to as substitute installation. In the example of FIG. 28, registering a 32 bit printer driver means that a 32 bit printer driver is registered instead of a 64 bit printer driver.

A 32 bit UI driver 38 is loaded to a 32 bit extended I/F unit 382 because the setting application 31A that uses the extended I/F unit 382 is designed with 32 bits. Accordingly, the UI driver 38 can accept printing settings or the like from the 32 bit setting application 31A.

The extended I/F unit 382 communicates with the Language Monitor 32 by way of an API referred to as "SendRecvBidiDataFromPort( )". Therefore, the extended I/F unit 382 can store printing settings or the like in the 64 bit Language Monitor 32 without having to consider combinations of the setting application 31A and the Windows type OS (e.g., 32/64 bit application, 32/64 bit OS). That is, it does not matter whether the setting application 31A and the Windows type OS is 32 bits or 64 bits because the API "SendRecvBidiDataFromPort( )" is used.

Further, the 64 bit render driver 39 communicates with the Language Monitor 32 by using the API referred to as "SendRecvBidiDataFromPort( )" in a case where a printing process is executed. Therefore, the render driver 39 can read out printing settings or the like from the Language Monitor 32 without having to consider combinations of the setting application 31A and the Windows type OS (eg., 32/64 bit application, 32/64 bit OS).

Accordingly, even in a case where a 32 bit application is operated in a 64 bit OS with the printer driver 30 according to the above-described embodiment of the present invention, a printing setting can be set with the setting application 31A by way of the extended I/F unit 382 and read out with the render driver 39.

Hence, with the printer driver 30 according to the above-described embodiment of the present invention, the following effects can be attained in a case where the application 31 uses the extended I/F unit 382 and sets printing settings:

1) Regardless of whether the RAW spool or the EMF spool is used, printing can be performed in accordance with a printing setting instructed by the extended I/F unit 382 of the printer driver 30;

2) Without relying on the spool type, printing can be performed in accordance with a printing setting instructed by the printer driver 30 (installed by the Point & Print method) by way of the extended I/F unit 382; and 3) Printing can be performed in accordance with a printing setting instructed by the extended I/F unit 382 of the printer driver 39 even in a case where a 32 bit application is operated in a 64 bit OS.

Further, the printer driver 30 can store a printing setting in DEVMODE. Further, the printer driver 30 can set all printing setting in the Language Monitor 32.

With the above-described embodiment of the present invention, regardless of the system environment, a printer driver can provided an extended I/F, and an application can set, for example, printing settings by using the extended I/F.

The present invention is not limited to the specifically disclosed embodiments, and variations and modifications may be made without departing from the scope of the present invention.

The present application is based on Japanese priority application No. 2012-064361 filed on Mar. 21, 2012, with the Japanese Patent Office, the entire contents of which are hereby incorporated by reference.

What is claimed is:

1. A data processing apparatus comprising:
a processor; and
a printing control program configured to, by way of the processor, request an image processing apparatus to execute a printing process, the printing control program including
a user interface program configured to, by way of the processor, display a screen for accepting a first printing setting condition, accept the first printing setting condition via the screen, and store the first printing setting condition in a predetermined storage area,
wherein the user interface program is configured to, by way of the processor, accept a second printing setting condition that is different from the first printing setting condition via an extended interface,
wherein the extended interface is configured to, by way of the processor, directly receive the first and second printing setting conditions from an application without intervention of a base program including an operating system that manages operations of the data processing apparatus,
wherein the printing control program further includes a control module configured to, by way of the processor, obtain the second printing setting condition accepted by the user interface program, store the second printing setting condition in another storage area that is different from the predetermined storage area, and transfer the second printing setting condition in response to a request from a render program,
wherein the printing control program further includes the render program configured to, by way of the processor, obtain the first printing setting condition from the predetermined storage area and convert printing data into data that can be processed by the image processing apparatus;
wherein the render program is configured to, by way of the processor, obtain the second printing setting condition from the another storage area by requesting for the second printing setting condition to the control module and convert the printing data based on at least one of the obtained first printing setting condition and the obtained second printing setting condition.

2. The data processing apparatus as claimed in claim 1,
wherein the image processing apparatus includes at least one of an image forming apparatus and an image transmitting apparatus,
wherein the user interface program is configured to, by way of the processor, accept an operation setting condition for controlling an operation of at least one of the image forming apparatus and the image transmitting apparatus, and store the second printing setting condition and the operation setting condition in a printing process program,
wherein the render program is configured to, by way of the processor, read out the second printing setting condition and the operation setting condition from the printing process program, and
wherein the render program is configured to, by way of the processor, maintain the printing data in a case where the operation setting condition includes a predetermined operation and transmit the maintained printing data to the image forming apparatus or the image transmitting apparatus in a case where the render program obtains a transmission instruction from the base program.

3. The data processing apparatus as claimed as claimed in claim 2, wherein in a case where the operation setting condition includes an operation of transmitting a plurality of document data in a batch when performing facsimile transmission, the render program is configured to, by way of the processor, maintain a plurality of printing data corresponding to the plurality of document data and transmit all of the maintained plurality of printing data to the image forming apparatus or the image transmitting apparatus in a case where the render program obtains a transmission instruction from the base program.

4. The data processing apparatus as claimed as claimed in claim 3,
wherein the user interface program is configured to, by way of the processor, accept an instruction from the control module for cancelling the second printing setting condition or the operation setting condition stored in the printing process program without using the base program, and
wherein the user interface program is configured to cancel the second printing setting condition or the operation setting condition stored in the printing process program.

5. The data processing apparatus as claimed as claimed in claim 2,
wherein the user interface program is configured to, by way of the processor, accept an instruction from the control module for cancelling the second printing setting condition or the operation setting condition stored in the printing process program by using the extended interface.

6. The data processing apparatus as claimed as claimed in claim 2,
wherein the user interface program is configured to, by way of the processor, use a first application to receive the second printing setting condition from the control module, and wherein the render program is configured to obtain a printing request via the base program by using a second application.

7. The data processing apparatus as claimed as claimed in claim 2,
wherein the printing process program includes a Language Monitor that can process the printing data converted by the render program.

8. The data processing apparatus as claimed as claimed in claim 1, wherein the user interface program is configured to, by way of the processor, associate the second printing setting condition with identification data and store the second printing setting condition in association with the identification data in the render program, and
wherein the render program is configured to read out the associated second printing setting condition.

9. The data processing apparatus as claimed as claimed in claim 8,
wherein the user interface program is configured to, by way of the processor, store logical printer data for distinguishing a printer driver with respect to an image forming apparatus or an image transmitting apparatus, and
wherein the identification data includes the logical printer data.

10. The data processing apparatus as claimed in claim 1,
wherein the user interface program is configured to, by way of the processor, request the control module to store the second printing setting condition accepted via the extended interface,
wherein the user interface program is configured to, by way of the processor, store the first printing setting condition that is not accepted via the extended interface in the predetermined storage area.

11. The data processing apparatus as claimed in claim 1,
wherein the render program is configured to, by way of the processor, inquire whether the second printing setting condition is stored in the another storage area to the control module,
wherein the control module is configured to, by way of the processor, transfer the second printing setting condition to the render program in a case where the second printing setting condition is stored in the another storage area.

12. A non-transitory computer-readable recording medium for causing a computer of a data processing apparatus including a processor to perform a data processing method, the method comprising the steps of:
requesting, by way of the processor, an image processing apparatus to execute a printing process with a printing control program, the printing control program including a user interface program, a render program, and a control module;
displaying, by way of the processor, a screen for accepting a first printing setting condition with the user interface program,
accepting, by way of the processor, the first printing setting condition via the screen with the user interface program,
storing, by way of the processor, the first printing setting condition in a predetermined storage area with the user interface program,
accepting, by way of the processor, a second printing setting condition that is different from the first printing setting condition via an extended interface with the user interface program, the extended interface directly receiving the first and second printing setting conditions from an application without intervention of a base program including an operating system that manages operations of the data processing apparatus,
obtaining, by way of the processor, the second printing setting condition accepted by the user interface program with the control module,
storing, by way of the processor, the second printing setting condition in another storage area that is different from the predetermined storage area with the control module,
transferring, by way of the processor, the second printing setting condition in response to a request from the render program with the control module,
obtaining, by way of the processor, the first printing setting condition from the predetermined storage area with the render program,
converting, by way of the processor, printing data into data that can be processed by the image processing apparatus with the render program,
obtaining, by way of the processor, the second printing setting condition from the another storage area by requesting for the second printing setting condition to the control module with the render program, and
converting, by way of the processor, the printing data based on at least one of the obtained first printing setting condition and the obtained second printing setting condition with the render program.

13. The non-transitory computer-readable recording medium as claimed in claim 12,
wherein the image processing apparatus includes at least one of an image forming apparatus and an image transmitting apparatus,
wherein the user interface program is configured to, by way of the processor, accept an operation setting condition for controlling an operation of at least one of the image forming apparatus and the image transmitting apparatus, and store the second printing setting condition and the operation setting condition in a printing process program,
wherein the render program is configured to, by way of the processor, read out the second printing setting condition and the operation setting condition from the printing process program, and
wherein the render program is configured to, by way of the processor, maintain the printing data in a case where the operation setting condition includes a predetermined operation and transmit the maintained printing data to the image forming apparatus or the image transmitting apparatus in a case where the render program obtains a transmission instruction from the base program.

14. The non-transitory computer-readable recording medium as claimed in claim 13, wherein in a case where the operation setting condition includes an operation of transmitting a plurality of document data in a batch when performing facsimile transmission, the render program is configured to, by way of the processor, maintain a plurality of printing data corresponding to the plurality of document data and transmit all of the maintained plurality of printing data to the image forming apparatus or the image transmitting apparatus in a case where the render program obtains a transmission instruction from the base program.

15. The non-transitory computer-readable recording medium as claimed in claim 14,
wherein the user interface program is configured to, by way of the processor, accept an instruction from the control module for cancelling the second printing setting condition or the operation setting condition stored in the printing process program without using the base program, and wherein the user interface program is configured to, by way of the processor, cancel the second printing setting condition or the operation setting condition stored in the printing process program.

16. The non-transitory computer-readable recording medium as claimed as claimed in claim 13,
wherein the user interface program is configured to, by way of the processor, accept an instruction from the control module for cancelling the second printing setting condition or the operation setting condition stored in the printing process program by using the extended interface.

17. The non-transitory computer-readable recording medium as claimed as claimed in claim 13,
wherein the user interface program is configured to, by way of the processor, use a first application to receive the second printing setting condition from the control module, and
wherein the render program is configured to, by way of the processor, obtain a printing request via the base program by using a second application.

18. The non-transitory computer-readable recording medium as claimed as claimed in claim 13,
wherein the printing process program includes a Language Monitor that can process the printing data converted by the render program.

19. The non-transitory computer-readable recording medium as claimed as claimed in claim 12,
wherein the user interface program is configured to, by way of the processor, associate the second printing setting condition with identification data and store the second printing setting condition in association with the identification data in the render program, and
wherein the render program is configured to, by way of the processor, read out the associated second printing setting condition.

20. The non-transitory computer-readable recording medium as claimed as claimed in claim 19,
wherein the user interface program is configured to, by way of the processor, store logical printer data for distinguishing a printer driver with respect to an image forming apparatus or an image transmitting apparatus, and
wherein the identification data includes the logical printer data.

* * * * *